US011376866B1

(12) United States Patent
Bullington et al.

(10) Patent No.: US 11,376,866 B1
(45) Date of Patent: Jul. 5, 2022

(54) PROCESS FOR OPTIMIZATION OF CURE SETTINGS IN THE PRINTING OF IMAGES ON TRANSPARENT AND SEMI-TRANSPARENT MEDIA

(71) Applicant: LSINC Corporation, Huntsville, AL (US)

(72) Inventors: James Richard Bullington, Athens, AL (US); Cody Landon Curtsinger, Madison, AL (US); Corey Michael Maxwell-Swarthout, Huntsville, AL (US); Joshua Boyd Jordan, Harvest, AL (US); Michael Edward Freeman, Huntsville, AL (US)

(73) Assignee: LSINC Corporation, Huntsville, AL (US)

( * ) Notice: Subject to any disclaimer, the term of this patent is extended or adjusted under 35 U.S.C. 154(b) by 0 days.

(21) Appl. No.: 17/385,275

(22) Filed: Jul. 26, 2021

Related U.S. Application Data

(63) Continuation-in-part of application No. 17/342,268, filed on Jun. 8, 2021.

(60) Provisional application No. 63/181,740, filed on Apr. 29, 2021.

(51) Int. Cl.
*B41J 11/00* (2006.01)
*F26B 3/28* (2006.01)
*B29C 64/106* (2017.01)

(52) U.S. Cl.
CPC ....... *B41J 11/00214* (2021.01); *B29C 64/106* (2017.08); *F26B 3/28* (2013.01)

(58) Field of Classification Search
CPC .. B41J 2/175; B41J 11/00212; B41J 11/00214
See application file for complete search history.

(56) References Cited

U.S. PATENT DOCUMENTS

| 5,873,315 | A | 2/1999 | Codos |
| 10,710,378 | B1* | 7/2020 | Bullington ............... B41J 2/175 |
| 2005/0190247 | A1 | 9/2005 | Unter |
| 2009/0244157 | A1* | 10/2009 | Hishida ............. B41J 11/00212 250/365 |
| 2014/0063154 | A1 | 3/2014 | Gould et al. |
| 2020/0316935 | A1 | 10/2020 | Bullington et al. |

* cited by examiner

*Primary Examiner* — Lam S Nguyen
(74) *Attorney, Agent, or Firm* — The Gache Law Firm, P.C.; Russell C. Gache

(57) ABSTRACT

A process is disclosed to precisely control the total amount of UV energy applied to images printed onto the exterior of a 3D object, such as a container like a wine bottle. The process includes establishing a UV dosage energy value to optimally cure an applied layer of ink expressed via an inkjet printing head onto the surface of the object, doing a partial cure of a printed ink layer, using a formula to calculate a power scale factor for the printed 3D object, and then based on the power scale factor tailoring a final cure step by controlling the amount of UV energy applied to the object to obtain an optimum cure result on the 3D object. The process allows for the control of a number of variables in the printing system to consistently apply an optimal amount of UV energy to the printed images.

20 Claims, 22 Drawing Sheets

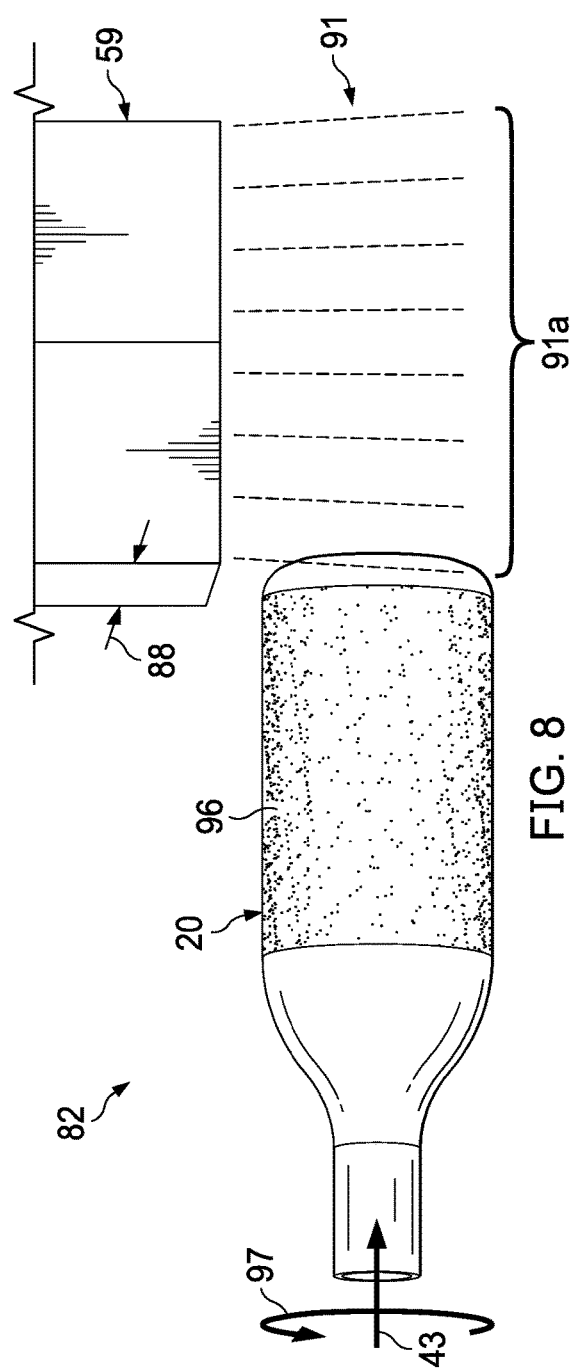
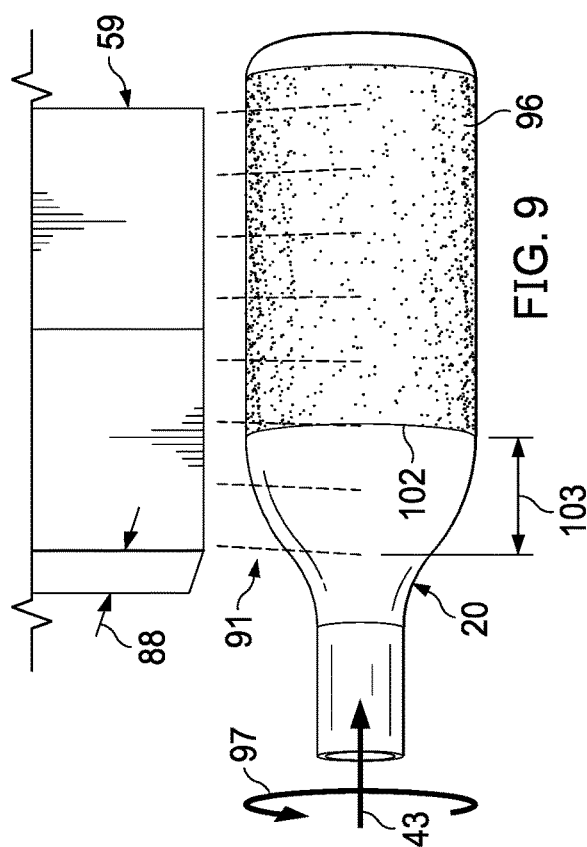

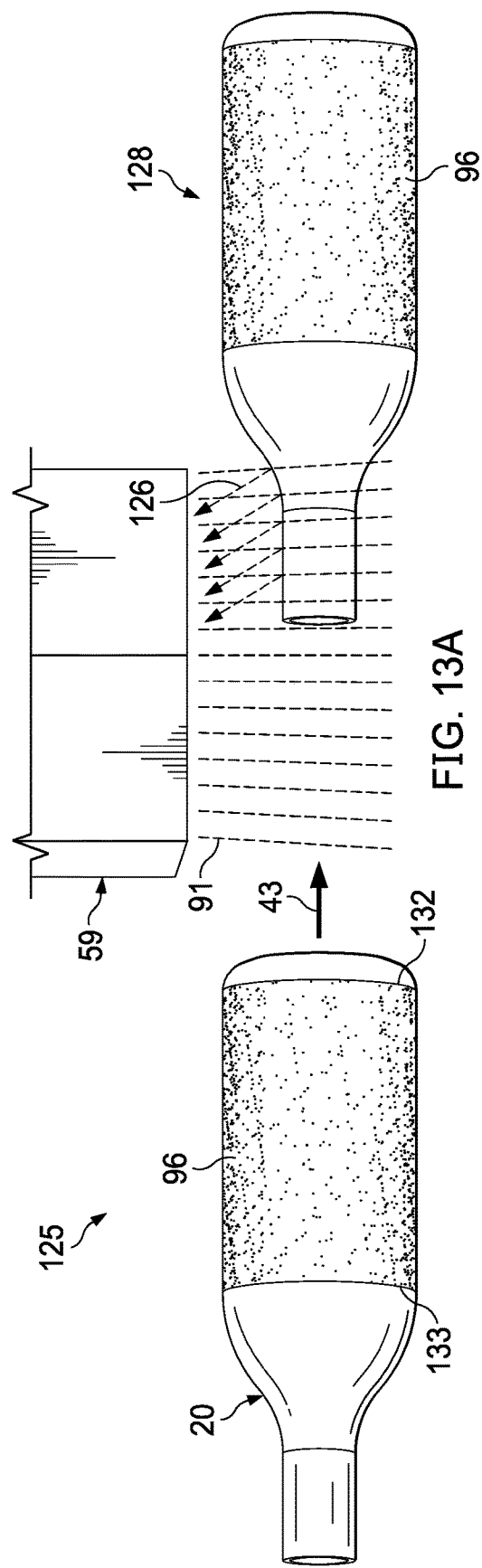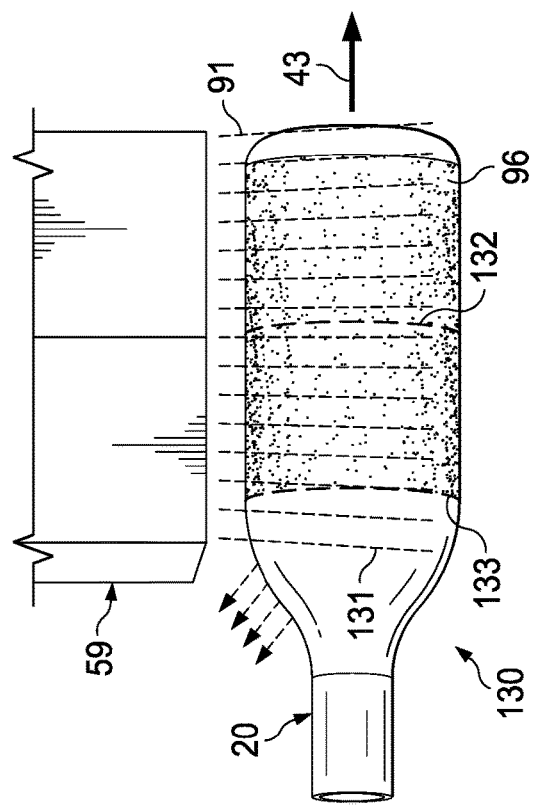

PROCESS FOR OPTIMIZATION OF CURE SETTINGS IN THE PRINTING OF IMAGES ON TRANSPARENT AND SEMI-TRANSPARENT MEDIA

This application claims the benefit of filing priority under 35 U.S.C. § 119 and 37 C.F.R. § 1.78 of the U.S. provisional Application Serial No. 63/181,740 filed Apr. 29, 2021, for a COMPACT MEDIA DECORATOR OPTIMIZED FOR TRANSPARENT AND SEMITRANSPARENT MEDIA, and priority from co-pending U.S. non-provisional application Ser. No. 17/342,268, filed Jun. 8, 2021, of the same title. All information disclosed in those prior pending applications is hereby incorporated by reference.

FIELD OF THE INVENTION

The present invention relates generally to the printing of images on articles of manufacture. In greater particularity, the present invention relates to printing images on the exterior of transparent and semi-transparent media, such as glass bottles. The invention also relates to the controlling of power provided by ultra-violet light emitters in direct-to-object or direct-to-shape ("DTS") printers for the pinning and curing of ink after the application of an image on the exterior of a piece of transparent media, such as 3-dimensional object like a bottle.

BACKGROUND OF THE INVENTION

Several techniques are utilized to print images on manufactured goods, such as drink and cosmetics containers. These containers are made of various materials, such as plastics, glass, metals, and coated paper. The traditional method for placing images on these containers, sometimes called "imaging," is to print a label on a plastic or paper substrate and then affix the pre-printed label onto the container exterior with adhesive. During the last 20 years many manufactures have transitioned from label printing to direct printing onto the container surface, sometime referred to as "direct-to-shape" (DTS) printing. However, while a label is a flexible medium and may be printed using traditional flexible sheet printing using methods going back over 100 years, direct printing on containers poses many challenges. One challenge is that while paper readily absorbs and retains inks and is a well understood medium for imaging, the containers themselves are made of materials that are difficult to image. Inks of special chemical blends and additives must be used, sometimes in the presence of active drying or hardening processes such as catalyst exposure or fast-curing using ultra-violet (UV) radiation. Further, container shapes are fixed, and an imaging process must take into account the irregular and varied shapes of the containers that are to be imaged. Such challenging print surfaces comprise a good-many products, such as drink cans and bottles, home care products, cups, coffee tumblers, personal care items, automotive parts, sports equipment, medical products, and electronics containers to name just a few. Also, such products have varying optical properties, ranging from purely opaque to purely transparent. Hence, choosing the proper type of DTS printing equipment largely depends on the shape, size, number of colors, and type of substrate to be imaged, as well as the level of transparency of the product media and surface type onto which to transfer the image.

Various techniques have been developed to achieve DTS printing. One technique, "pad printing," allows the transfer of a two-dimensional image onto a three-dimensional surface through the use of a silicone pad, an ink cup, and an etched plate. Pad printing is ideal for difficult substrates such as products found in the medical field and promotional printing, but due to the expense of the process pad printing typically uses only 1 or 2 colors during a print job, thereby limiting the artistic expression available to three-dimensional surfaces.

Another technique screen printing utilizes a mesh or screen to transfer the ink to the substrate surface. The process requires creating a screen that selectively permits ink to flow through the screen using a blocking stencil. While a photographic process may be used to create the screen, and hence allows relatively good resolution of imaging, the process requires substantial set-up time and is less flexible because any update or small alteration to the image to be applied requires the creation of a new screen set which increases the time and expense for a screen process versus other DTS imaging processes. In addition, screen printing is typically restricted to only 1 or 2 colors because each color requires its own separate customized screen, thereby tending to limit artistic expression onto three-dimensional surfaces.

Due to the above limitations, inkjet printing has over time risen to be the preferred method for DTS printing, especially for package printing and printing on durable exterior surfaces, such as containers. Inkjet printing utilizes a digital printhead to print full color customized designs in one or multiple imaging passes and may be applied directly to the substrate surface of the object or medium. Developed in the 1970s, inkjet printers were created to reproduce a digital image directly onto a printing surface which is achieved by propelling droplets of ink directly onto a substrate medium. The ink delivery mechanism used to propel the droplets of ink is called the "printhead," and is controlled by a connected computer system that sends signals to the printhead based upon a digital image held by the computer system. Since the digital image may be altered an infinite number of times, replication and refinement of an image applied through the printhead is easily achieved.

However, the design of printheads in an inkjet system varies greatly increasing the complexity of creating a DTS printer. Each head is uniquely designed for its application, and a variety of digital printer designs are available to be used to print on various substrates. Hence, various factors drive the selection of an inkjet printing system to be utilized for a DTS project, such as the type of product substrate to be printed, the volume of products to be printed, and the required manufacturing speed for the imaging of any product traversing through a manufacturing line.

Irrespective of the complexity of designing an inkjet printing system to meet a particular DTS target object, the benefits of inkjet printing in DTS applications have driven a preference to use inkjet systems in product manufacturing lines. The reasons for this are numerous. For example, inkjet printing requires less set-up time and allows for faster print and cure times. Inkjet printing also is configurable to allow printing on multiple items at once, whereas other printing methods are often restricted to a single print instance for each object being printed. Moreover, print jobs do not require fixed setup time and costs, such as the generation of screens or the installation of plates, and therefore digital images may be easily and inexpensively refined to meet the particular surface characteristics of a three-dimensional object, thereby maximizing the artistic expression capabilities of the printing system.

One great advantage of inkjet printing is the ability to change or refine graphic images quickly, sometimes almost in real-time, to adjust printing results or to reconfigure the printing system for a different three-dimensional object. Modern imaging software is template driven and allows for the importation of new or re-worked graphics instantly. Hence, the flexibility of image alteration on a job-by-job basis is a distinct advantage.

In addition, inkjet printers are flexible enough to be used for short and long printing production projects, thereby meeting various manufacturing demands. For example, a single machine may be used to prototype or provide a sample, low-volume job for a potential client, or that same machine may be used in the same facility to print thousands of articles in a day for high volume production run. Further, the same machine may use various types of inks to accommodate a myriad of three-dimensional object surface materials.

Finally, conveyor and assembly line capability allow the inkjet printing process to become highly automated which increases productivity and lowers labor costs. So-called "inline" printers can do such printing at incredibly fast production rates. Typically, the inkjet printhead remains stationary while the three-dimensional object surface is moved underneath the printhead to maximize material handling through-put rates. This type of inkjet system is ideal for barcoding and dating product packaging. Single-pass multi-color inkjet printers are similarly used to achieve higher quality imaging with more color options at slightly slower print speeds, but still at a high-rate of production.

One type of inkjet system is specialized to print on the surface of cylindrical containers and are called "digital cylindrical presses." For example, The INX Group Ltd. (aka "Inx Digital" and "JetINX") a division of Sakata INX offers a cylindrical printing solution under its CP100 and CP800 line of direct-to-shape (i.e. DTS) inkjet printing systems. These systems allow for the creation of an inkjet production line to print directly onto axially symmetrical objects. Other companies offer similar systems, such as Inkcups Now Corporation which offers its Helix line of DTS printers. These printers use a rotatable mandrel to hold an object and rotate the object next to an inkjet printhead as the printhead jets ink onto the surface of the cylindrical object. An image is captured for transfer onto an object and a printing "recipe" created, either created by the printing machine itself or created separately on personal computer and then imported into the printing machine. The "recipe" includes information necessary for the printing of the image onto an object and the recipe parameters are specific to each type of printer utilized. In these types of DTS systems, the raw, undecorated three-dimensional object is usually referred to simply as "media."

The CP100 machine is a good example of an industry standard cylindrical DTS printing system. The system is a stand-alone machine that performs non-contact printing of images on generally cylindrical objects, and in particularly hollow cylindrical objects or hollow partially cylindrical objects, for example, single piece cans and bottles and two-piece cans and bottles. Each cylindrical object is hand-loaded onto the machine and secured by vacuum on a mandrel to prevent slippage, which is part of a carriage assembly that functions to linearly positioning the object beneath at least one digitally controlled inkjet printhead. The object is rotated in front of the printhead while ink is deposited onto the object to produce a desired printed design on its surface. The ink is either partially or fully cured immediately after printing by exposing the ink to an energy-emitting means, such as a UV light emitter, positioned directly beneath the object. A carriage assembly is fixedly mounted to a linear slide actuator, which is in turn fixedly mounted to a mounting frame, whereby the carriage assembly is free to traverse along the linear slide actuator. The carriage linearly advances the object in a position adjacent to the inkjet printhead such that a first portion of the object may be printed if the object length is longer than the length of the printhead. The object is rotated while the computer-controlled printheads deposit ink from a supply of ink located above the object being printed upon. Simultaneously the UV light emitter either partially or completely cures the ink. The carriage then continues to advance the object further such that the entire length of the object surface is printed upon. As may be understood, the continuous advancement of the object by the printhead may not be necessary if the printhead is longer than the image desired to be printed on the object, but this is typically not the case and the object must be advanced along a straight path underneath the printhead. The image itself comprises a digital image that is imported from a separate imaging application and loaded into a software application that is used to create the object recipe to accommodate the physical specifications of the object. A profile is loaded through an operating system present on the machine and utilized to control motion of the object held by the carriage assembly along the linear slide. A print engine running on the machine controls the delivery of ink onto the object via the inkjet printhead as the object is moved past the printhead in a digitally controlled manner. The precise deposition or expression of the ink via the inkjet heads is dependent upon the object recipe which includes the specific amount and color of ink applied to the object as it traverses the printhead. The structure and operation of standard cylindrical DTS printing systems are fairly well understood in the printing industry and disclosed in representative U.S. Pat. Nos. 6,918,641B2 and 7,967,405B2.

One challenge facing such DTS printing systems is the application of images to the surfaces of clear media, such as transparent glass or plastic media, or even semi-transparent objects such as frosted or color tinted media. Typical DTS systems, such as the above referenced Helix line of DTS printers position UV pinning and curing lamps below a rotating object. However, for transparent or translucent media this poses a problem. Transparent and similarly optically transparent media tends to scatter UV light and often causes UV light to impinge upon the printheads of the inkjet system. The incident UV light often causes the instant hardening of the ink on the printhead nozzles. This can cause the total or partial fouling of the inkjet head requiring either removal and cleaning of the printhead, or more often the complete replacement of the printhead. This interferes with the production time of any print job causing significant delays as the inkjet head is replaced and then recalibrated. Moreover, partial fouling may cause the degradation of image quality applied to the surface of media which may not be discovered until much later in a production run of a high quantity of printed products, thereby causing the loss of time and costly ink required to reprint the media, or even causing the total loss of processed products which in most instances cannot be reprinted and must be discarded.

Some have tried to reposition inkjet printing heads or the curing lamps, such as horizontally positioned lamps relative to downwardly pointing inkjet printing heads, to avoid such fouling, but such designs limit the number of objects that may be printed simultaneously and also do not address the quality issue of printed images on clear media because such repositions do not provide a consistent and controlled dosage amount of UV light to be applied to images. This causes an uncertain and inconsistent application of UV light to the applied images and reduces the overall quality of the applied images resulting in a visually unattractive printing result for a consumer, or worse an inability of the image to adhere properly to the object once applied.

An additional problem with clear or transparent media is the inability to properly gauge the total amount of UV light that is being applied to the surface of each object during a printing process. Currently, 3D media or object printing is achieved by first applying a reduced amount of UV light to ink applied to the surface of an object, often referred to as "pinning" the ink to the surface, which causes a partial hardening of the ink so that it adheres to the object surface while the object is rotated. This also allows for different colors to be applied to the surface as successive layers of imaging colors are applied during rotation, thereby allowing for a full range of artistic expression onto the object surface. However, each ink and even each color of a particular ink is precisely formulated to harden when exposed to UV light, with each ink varying in the amount of hardening reaction responsive to the application of the UV light. In transparent object printing, UV light easily passes through and is reflected off the various curved surfaces in the object during the printing, pinning, and curing steps. The hardening of an image onto a surface resulting from UV light exposure is additive in nature, with each exposure step increasing the total amount of hardening of the ink during a printing process. If too little total UV light is applied to the surface of an object, an image may not exhibit acceptable visual quality or may not be retained once shipped to a consumer. If too much total UV light is applied, the printed image may also not be retained, and annoyingly exfoliates during use by a consumer. Hence, manufacturers have learned that a precise amount of UV light must be applied that varies with each printed design for each type of media being printed. In fact, the size and shape of each media must be accounted for in order for an acceptable and permanent image to be properly applied to the object.

Unfortunately, the attractive reflective properties of clear media cause stray UV radiation to impinge onto the ink, including from within the object, and make it difficult or impossible to control let alone predict the amount of UV light that is applied to the surface of an applied image. Hence, transparent media pose an acute problem during printing because a manufacture is unable to precisely predict the amount of UV light causing hardening that will occur during any particular ink application step. This again results in less than desirable image quality and less than ideal image retention on the object once printed.

Therefore, what is needed is a process for controlling the amount of UV energy that may be applied to images during printing on transparent or semi-transparent 3D objects using traditional inkjet printing processes and traditional UV emitter lamp technology without the delays and quality degradation currently experienced in the DTS printing industry due to the uncertain guessing of curing energy applied to transparent media.

SUMMARY OF THE INVENTION

It is the object of the present invention to precisely control the total amount of UV energy applied to images applied to the exterior of a 3D object, such as a container. The process includes establishing a UV dosage energy value to optimally cure an applied layer of ink expressed via an inkjet printing head onto the surface of the object, doing a partial cure of the applied ink layer, using a new formula calculating a power scale factor applicable to the partially cured ink layers, and then based on the power scale factor tailoring a final cure step by controlling the amount of UV energy applied to the object to obtain an optimum cure result on the 3D object. The process allows for the control of a number of variables in the printing system to economically print images on the exterior of 3D objects while consistently applying an optimal amount of UV energy to the expressed images.

Other features and objects and advantages of the present invention will become apparent from a reading of the following description as well as a study of the appended drawings.

BRIEF DESCRIPTION OF THE DRAWINGS

A process for optimization of cure settings in the printing of images on transparent and semi-transparent media incorporating the features of the invention is depicted in the attached drawings which form a portion of the disclosure and wherein:

FIG. 8 is a diagrammatic view of a final cure step in the printing process of the decorating machine;

FIG. 9 is a further diagrammatic view of a portion of the final cure steps during printing;

FIG. 13A is a diagrammatic view of a final cure UV lamp above a rotating piece of media as it moves under the UV lamp;

FIG. 13B is another a diagrammatic view of a final cure UV lamp above a rotating piece of media showing curing lamp intensity variations during a final cure step;

DESCRIPTION OF THE PREFERRED EMBODIMENTS

Figure 1:
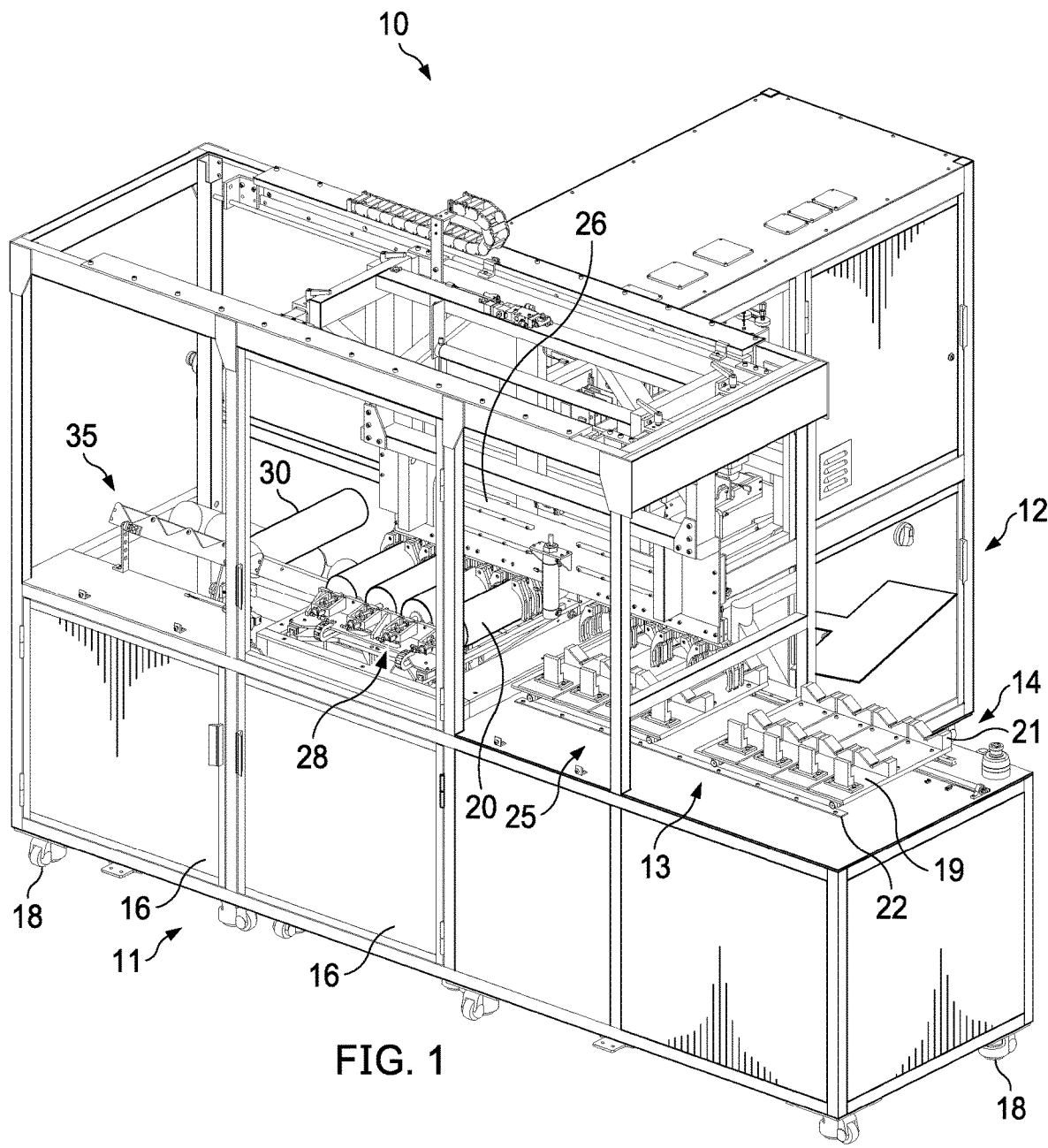
FIG. 1 is a front perspective view of the 3D object decorating system showing the major elements of the machine.
Figure 2:
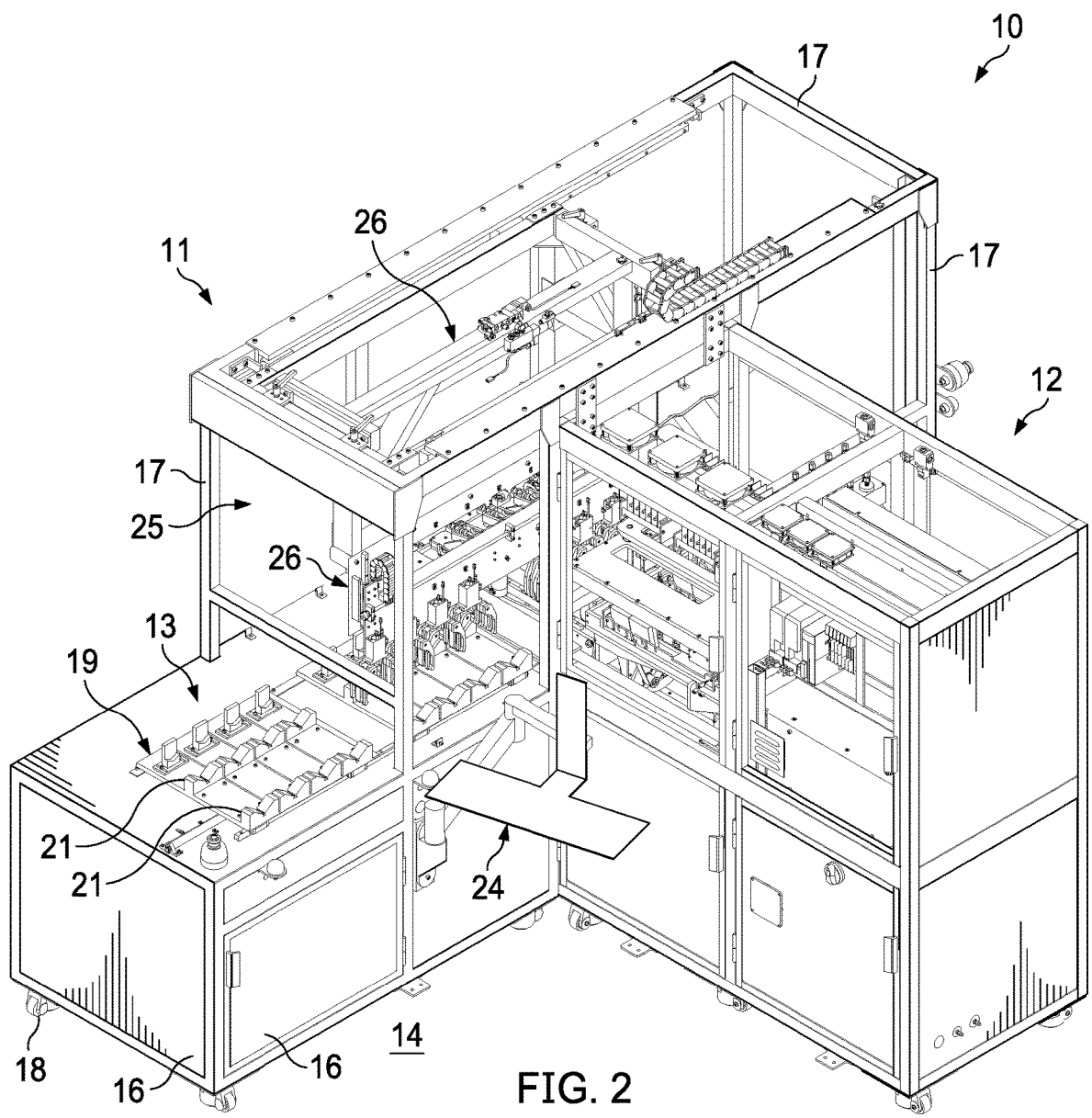
FIG. 2 is a rear perspective view of the decorating system showing the arrangement of the printing portion of the decorating system in relation to the material handling portion of the machine.

Referring to the drawings for a better understanding of the function and structure of the invention, FIGS. 1 and 2 show perspective views of the decorating machine 10 showing the primary external components of the system. Machine 10 includes a material handling or "feed" system portion 11 and a printer system portion 12 mated to one another in a "T" configuration. An operator is positioned adjacent to the feed system 11 at a convenient location 14 from which they may load undecorated media 20 onto a loading shuttle 19 positioned in a loading area 13 and adjust the operation of the system 10 through a human machine interface (HMI) via a display terminal (not shown) held by support 24. The shuttle 19 is supported by a pair of rails 22 and includes media support brackets 21 that are sized to support a variety of sizes of media 20 in a horizontal orientation. For the purposes of the present system, the targeted type of undecorated media is a transparent (i.e. visually clear) or semi-transparent (e.g. translucent, frosted or colored glass containers) 3D object. Each portion (11,12) of the machine 10 includes suitable support frames 17, external panels 16, and support rollers 18 through which each subsystem is supported.

Once loaded with undecorated media 20, shuttle 19 may be moved by the operator from the loading area 13 to a pickup area 25 along rails 22. Pickup area 25 is positioned such that a pneumatic robot 26 may grip and raise each undecorated media piece above the shuttle 19 and deliver it onto a printing carriage 28 for conveyance into printing portion 12, or for removal of decorated media 30 from printing carriage 28 and delivery into product removal area 35. The removal area may include tilted supports 34 as shown to facilitate removal of decorated product from the machine 10 by an operator.

Figure 3:
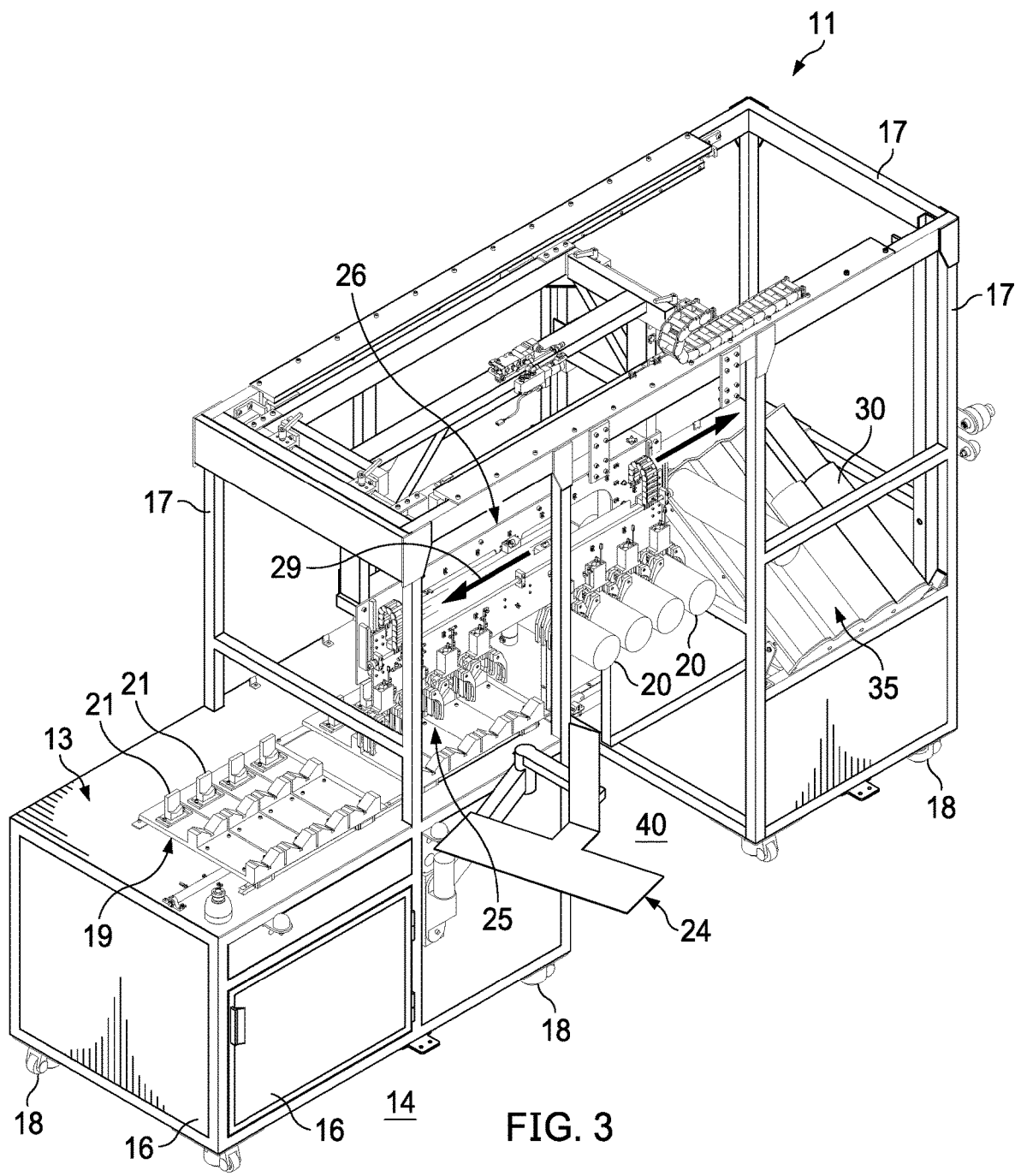
FIG. 3 is a rear perspective view of the material handling portion of the machine.
Figure 3A:
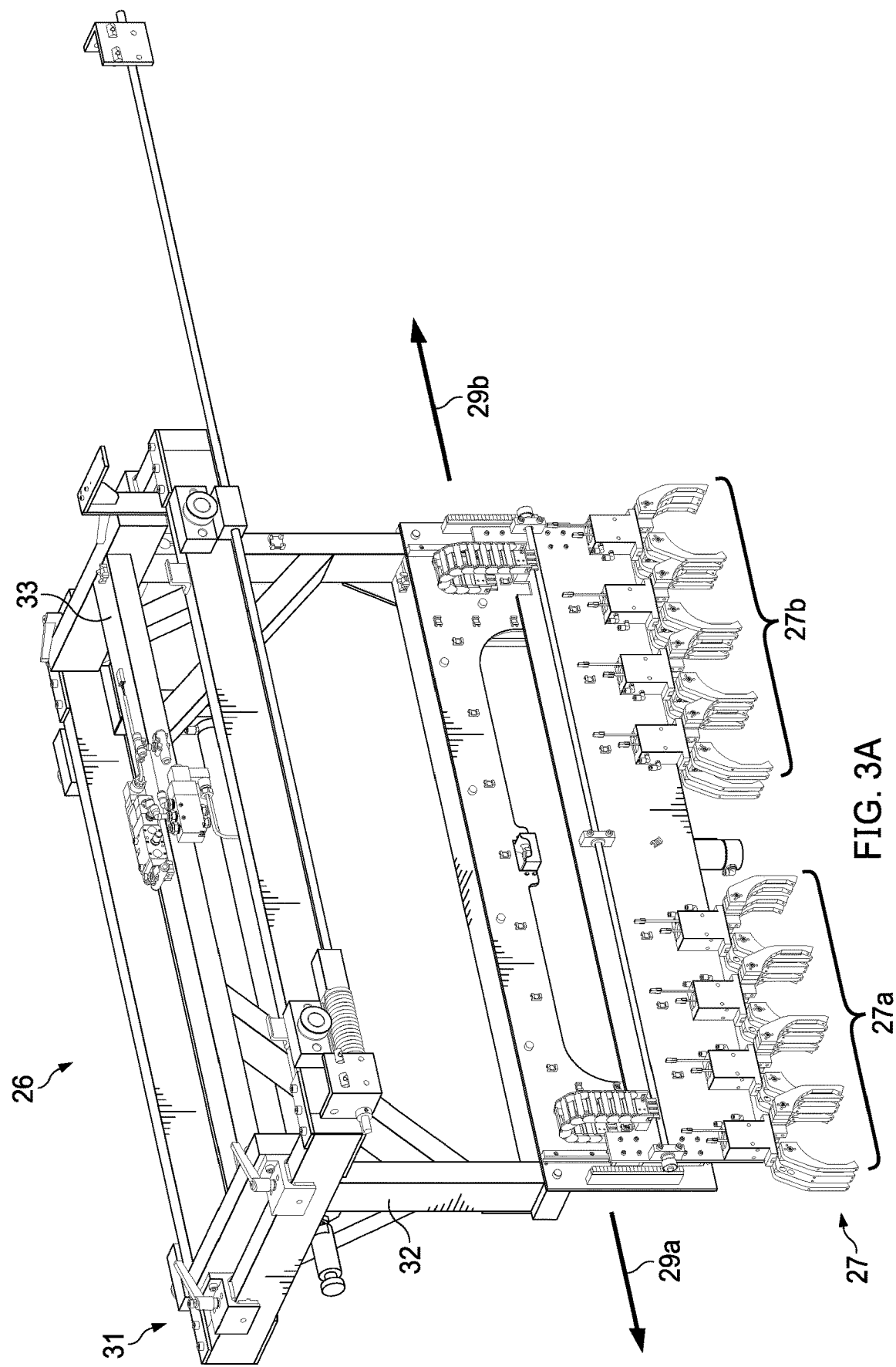
FIG. 3A is a perspective view of the pneumatic robot handler within the handling portion of the machine in isolation.

FIG. 3 shows a closer view of the media handling portion of the system 10 with the printer portion 12 removed. As may be seen, pneumatic robot 26 can move either left or right to deposit media from the loading pickup area 25 to the printer carriage 28 or from the printer carriage 28 to the product removal area 35. Printer carriage 28 is supported by a portion of printer 12 that is positioned or mated with portion 11 within a vacant section 40 of material handler 11. As more easily seen in FIG. 3A, pneumatic robot 26 includes a gantry subassembly 31 having a lower gripper assembly 32 depending downward via vertical supports as shown. Gripper assembly 32 includes at least two sets of gripping or grasping mandibles 27(a,b) that are sized to open and close around 3D objects, such as a container like a wine bottle and the like, which are generally referred to herein as "media." A pair of rails 33 are held by gantry 31 to allow for the slidable movement of gripper assembly 32 to slide along a media loading path 29a or along a media unloading path 29b. The arrangement allows for the rapid simultaneous movement of two sets of media to and from loading and unloading areas 13 and 35.

Figure 4:
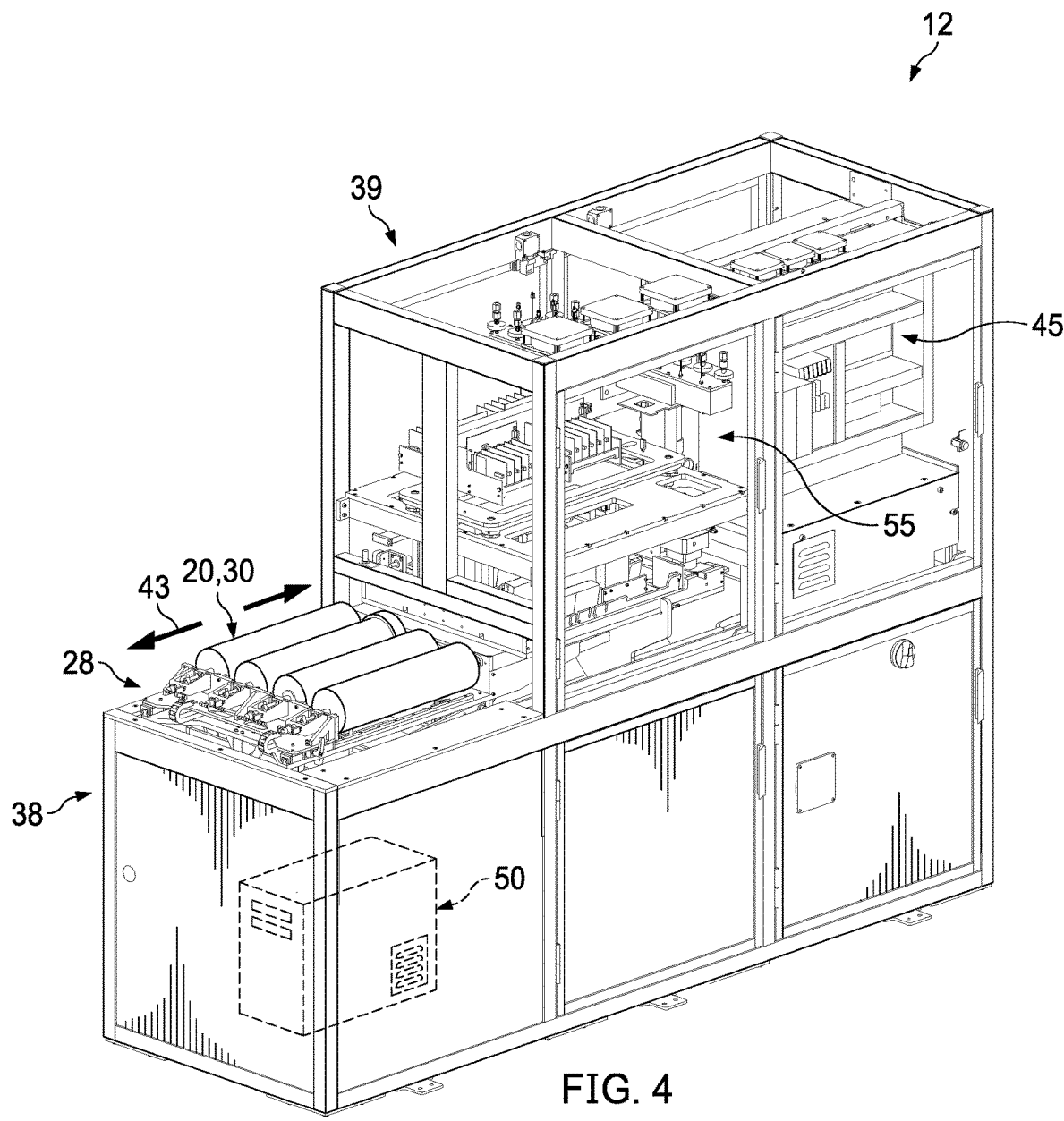
FIG. 4 is a front perspective view of the printing portion of the decorating machine.
Figure 5:
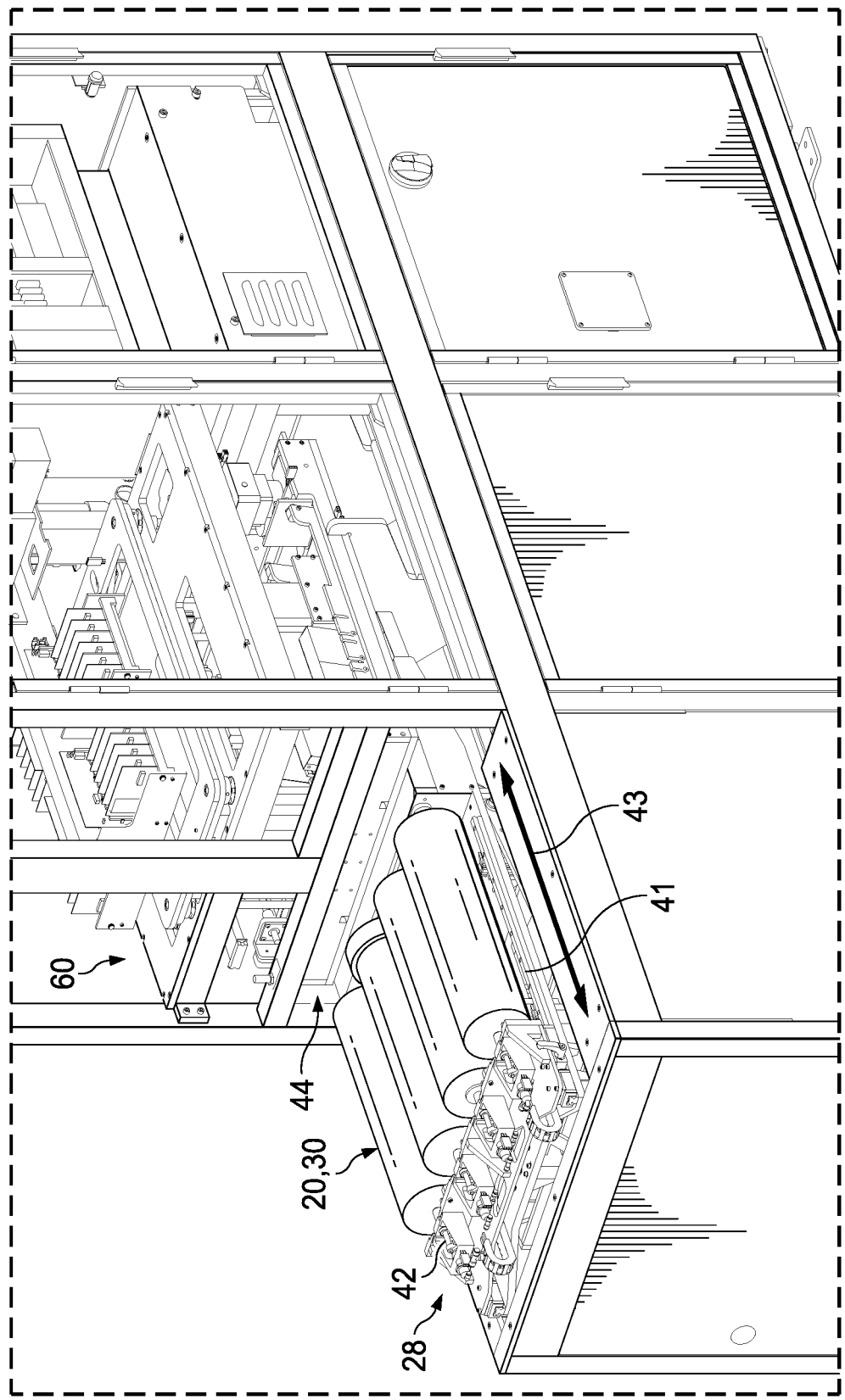
FIG. 5 is an expanded front perspective view of the printing portion of the decorating machine.

Referring now to FIGS. 4 and 5, it may be seen that printer carriage 28 is supported by a pair of rails 41 on a lower enclosure 38 that is sized to fit into space 40 of material handler 11. When enclosure is mated with handler 11, the rails 41 permit printer carriage 28 to traverse from within the handler 11 and into a series of parallel printing tunnels 44 along path 43 and formed within printer section 12. Printing occurs on each piece of undecorated media 20 within these tunnels 44. The disclosed embodiment shows 4 tunnels, but the inventors foresee that the number of tunnels may be enlarged to increase material printing throughput to the extent that the material handling section is designed to move material across an increased number of tunnels using an enlarged gripping set.

Printer 12 includes a lower front enclosure section 38 that is connected to a taller section 39 that holds various printer support subsystems. Lower enclosure section 38 houses a standard personal computer or PC 50 that is connected through cables with display terminal (not shown) held by a display terminal support 24 for control of the system 10 via an HMI by an operator. A suitable PC for system 10 is a 2.9 GHz Intel Core i7, with 16 GB RAM and an Intel UHD graphics processor 630, and running Windows 10 (HP part No. 2X3K4UT #ABA). Section 39 includes an ink delivery subsystem 45 connected and controlled by the personal computer 50 for delivering ink to a series of inkjet printer heads within printer image deposition and curing area 55. A suitable print engine and ink recirculation system for system 10 is the available from INX International Ink Co. under part Nos. 99-14080 (Head Drive Mother Board) and 99-14081 (Gen 4 Printhead Control Board) as part of their JetINX™ printhead drive electronics component and ink delivery system offerings. As will be further discussed, tunnels 44 are sized to allow the passage of media 20 underneath section 55 and include a plurality of inkjet heads and UV lamps that are positioned within close proximity to the surface of each piece of media 20 once positioned within each tunnel 44. Suitable printheads for printer portion 12 are the Gen 4 Print Heads offered by Ricoh Company, Ltd. under part No. N220792N. Suitable UV lamps for both final curing and ink pinning are available from Phoseon Technology under its FireEdge FE400 LED curing line of products (Part No. FE400 80X10 8W).

Figure 6:
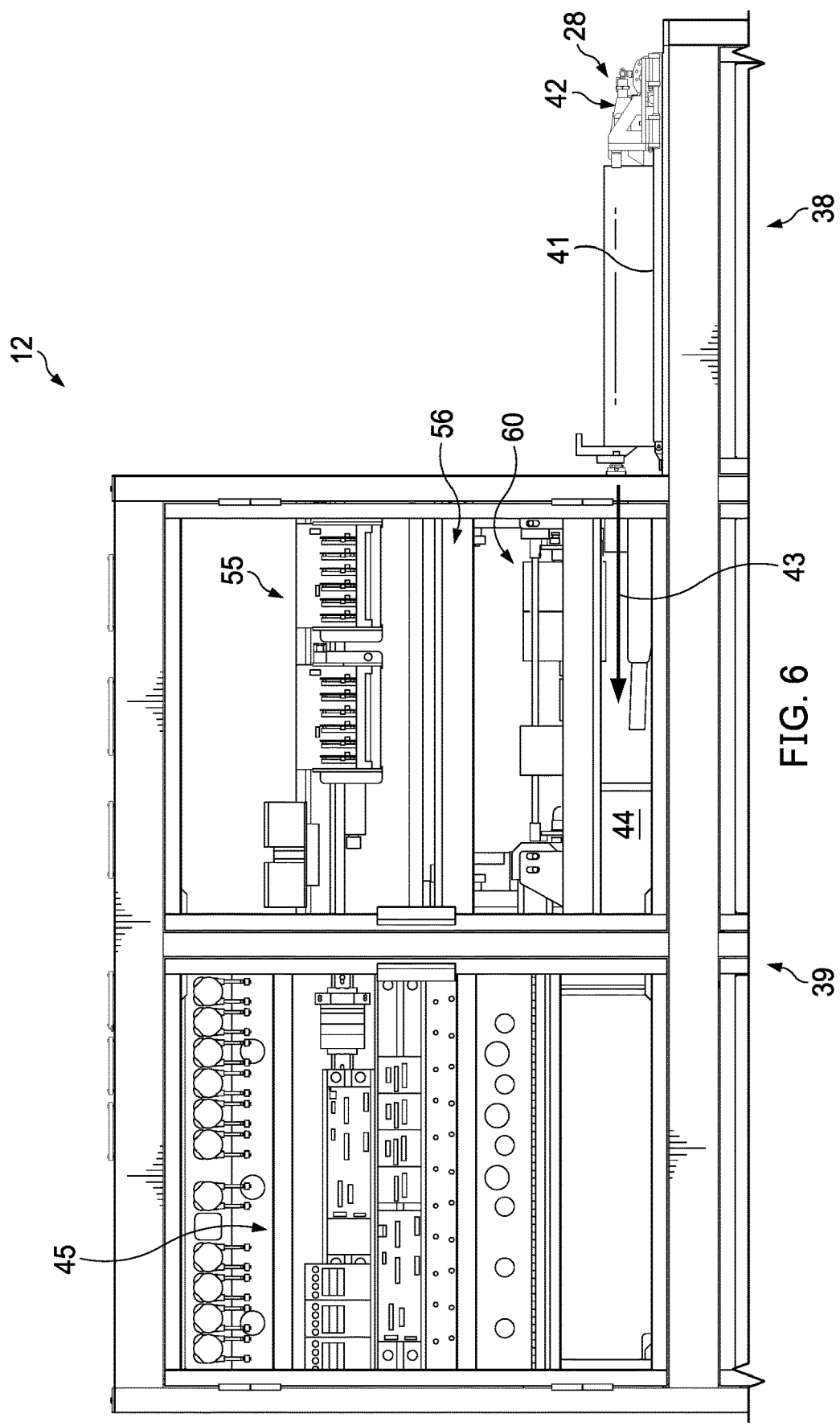
FIG. 6 is a side elevational view of the printing portion of the decorating machine.
Figure 7A:
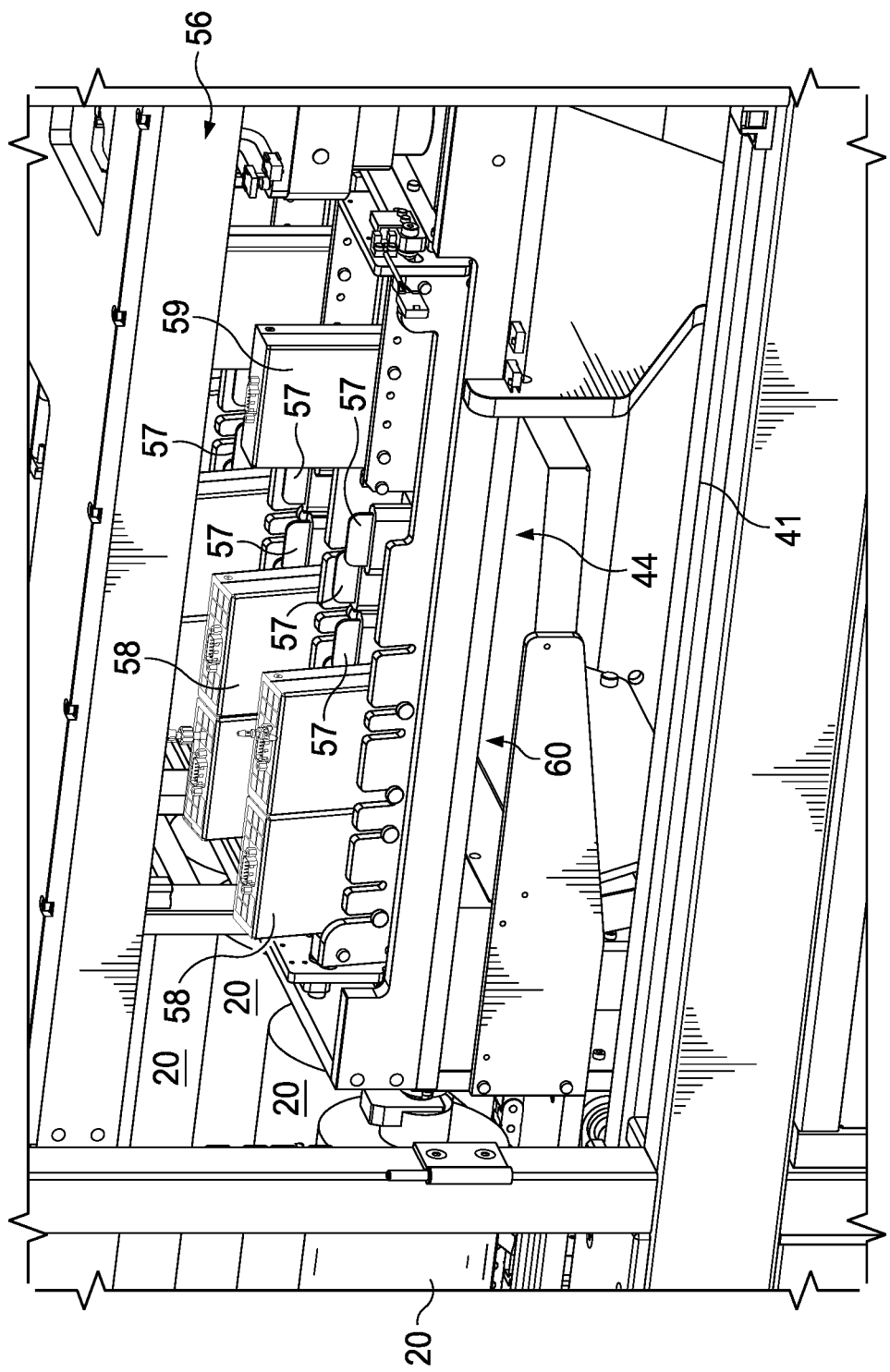
FIG. 7A is an expanded right perspective view of the printing portion of the decorating machine showing the arrangement of the printheads and UV emitters.
Figure 7B:
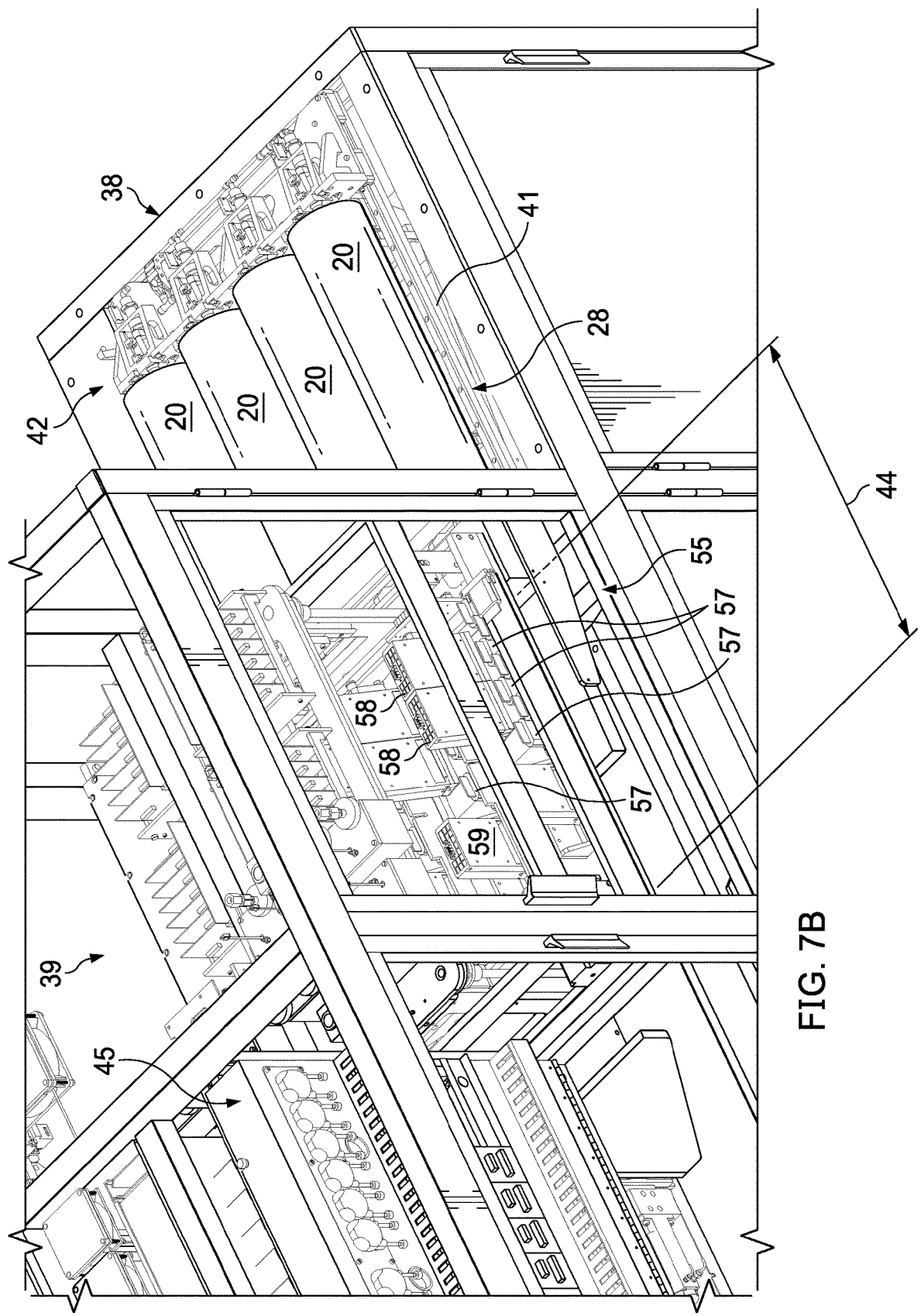
FIG. 7B is an expanded left perspective view of the printing portion of the decorating machine showing the arrangement of the printheads and UV emitters.
Figure 7C:
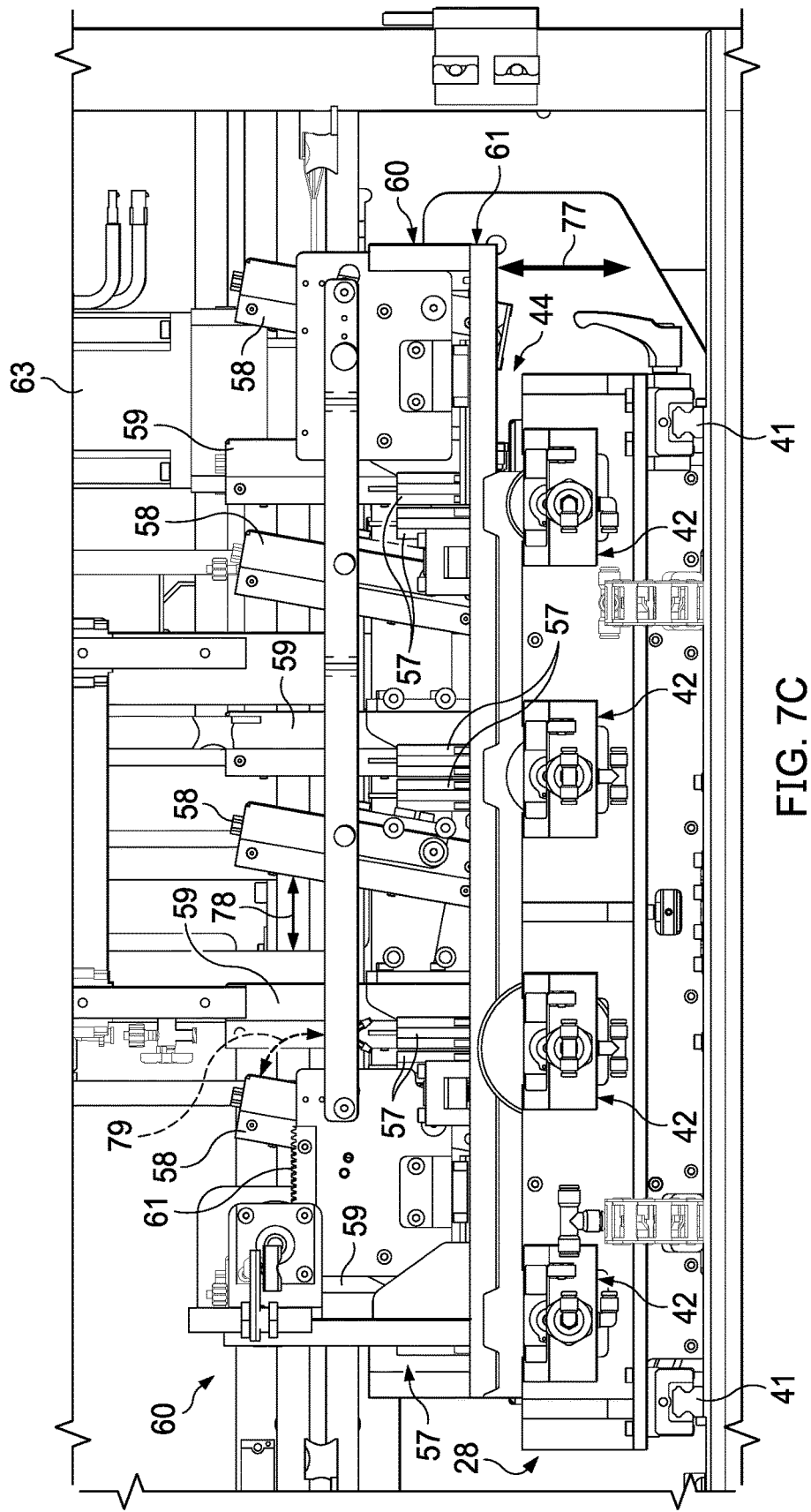
FIG. 7C is an expanded front, elevational view of the printing portion of the decorating machine showing the arrangement of the printing carriage and printing tunnels.
Figure 7D:
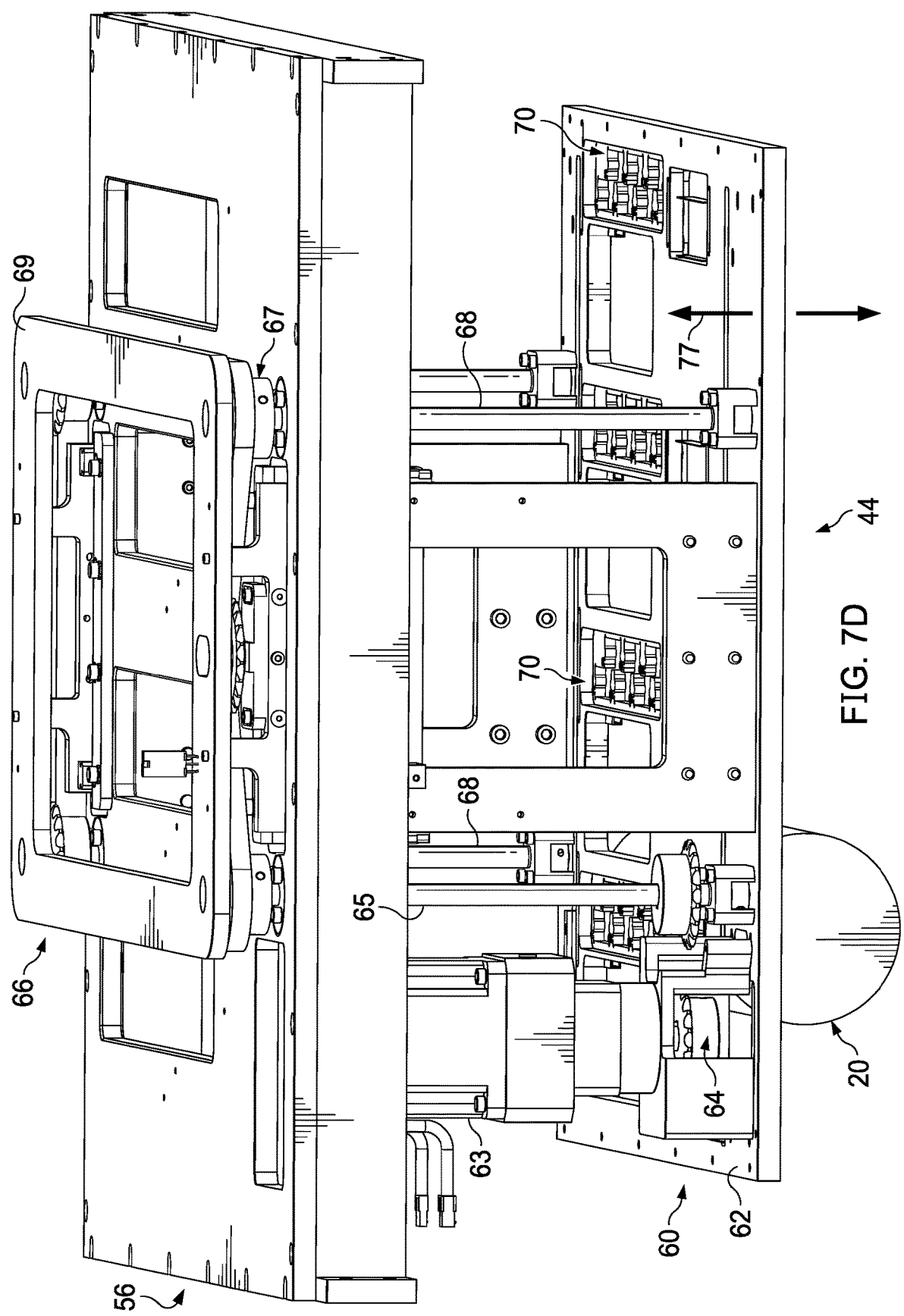
FIG. 7D is a perspective view of the printing portion of the decorating machine showing the lifting gantry and printer support assembly in isolation.
Figure 7E:
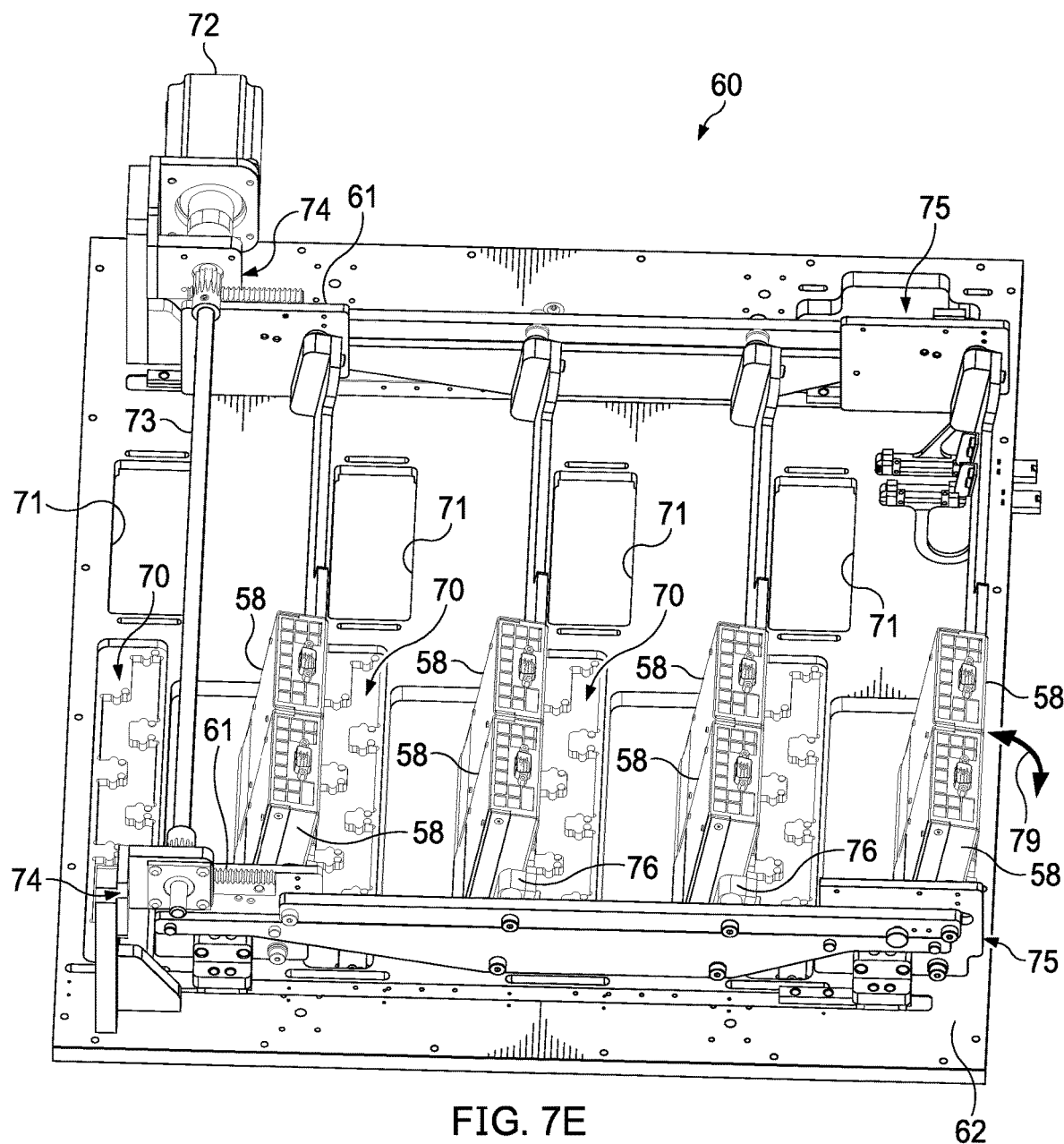
FIG. 7E is a top perspective view of the printing support assembly of FIG. 7D shown in isolation.
Figure 7F:
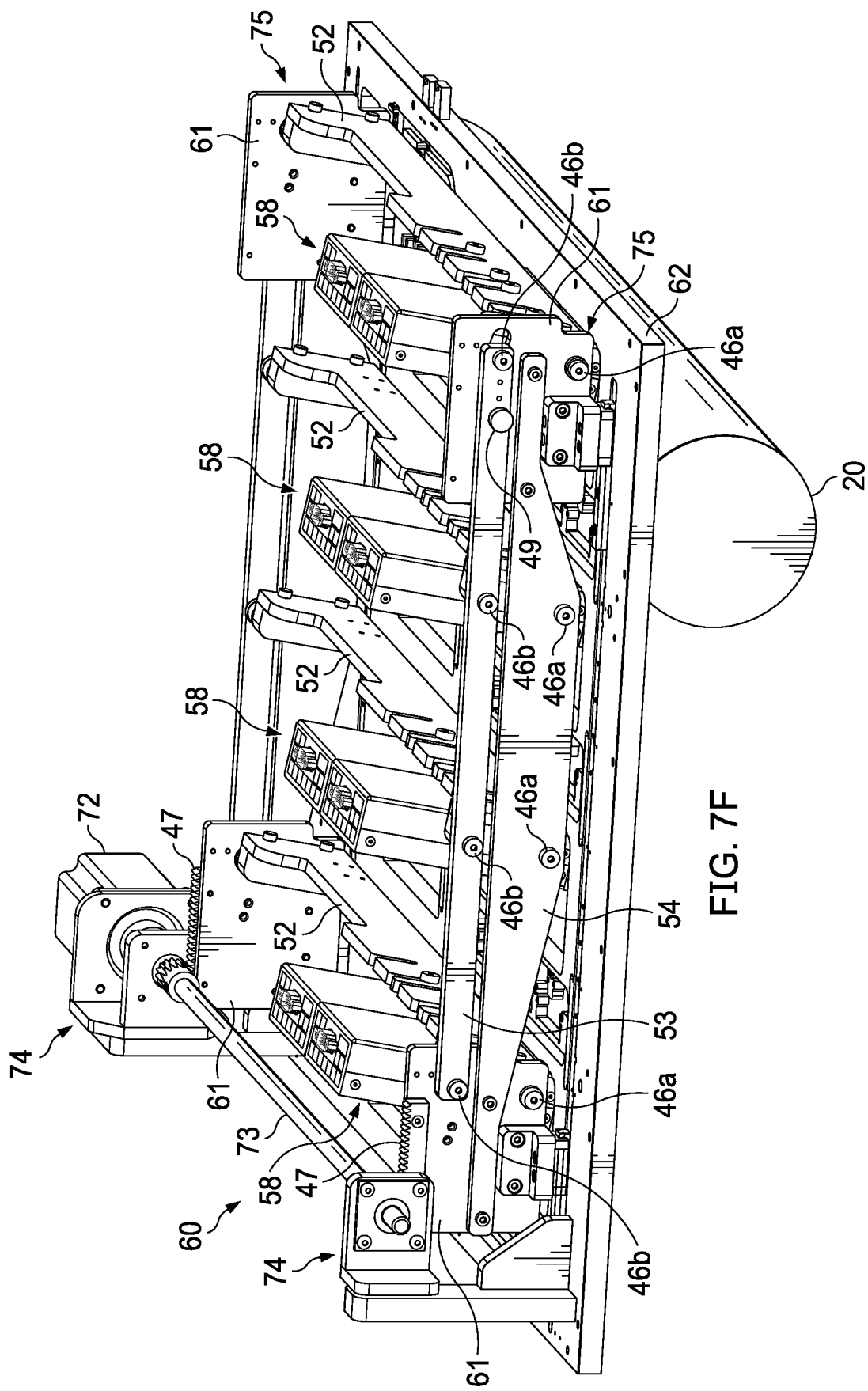
FIG. 7F is front perspective view of the printing support assembly of FIG. 7D showing the lateral and angular movement adjustment means.

FIG. 6 shows the tunnel area 44 above which a printhead and cure lamp support assembly 60, including a support gantry 56, are positioned to allow for adjustment of the relative positions of the printheads and cure lamps so that various sizes of media may be accommodated by the printer 12.

Referring to FIGS. 7A-7E it may be seen the tiltable arrangement of the pinning UV lamps 58 in relation to the printheads 57 and final cure UV lamps 59. Gantry 56 may be raised and lowed in response to operator inputs that set heights in relation to each media size, thereby raising and lowering the printheads 57 and final cure lamps 59 which are affixed and supported by support assembly 60. Pinning lamps 58 are also supported by support assembly 60, but are able to be tilted via connected motorized racks 61 as well as move laterally relative to the center of each media piece. An operator enters via a human machine interface (HMI) geometries for the media piece to be utilized in a printing job, such as for example the length, diameter, and conical slope (if any) of the surface of the media piece, and a PC actuates movement of the gantry 56 and motorized racks 61 to accommodate the media size. A suitable PC/HMI system for the herein described operator control may be found in U.S. patent Ser. No. 10/710,378B, at Col. 11, line 19 through Col. 13, line 15, and FIGS. 12-13 (commonly owned by the Applicant), all of which is hereby incorporated by reference. Actual movement distances are self-generated via PC 50 and communicated electrically to a control board that issues movement commands to motors controlling the racks 61 and gantry height 77. A suitable motion control board system for the above may be found in U.S. patent Ser. No. 10/710, 378B, at Col. 13, line 16 through Col. 14, line 47, and FIG. 13 (commonly owned by the Applicant), all of which is hereby incorporated by reference. Printer support assembly 60 moves vertically (up and down) along path 77, and UV pinning lamps 58 move laterally along path 78 and along angular path 79. Motor 63 drives a primary lifting shaft 65 via gearing assembly 64 that in turn drives three passive vertical lifting drive shafts 68. A quadrilateral gearing assembly 66 having a fixed support frame 69 fixed to gantry 56 and four corner gearing assemblies 67 connects and supports each drive shaft 68 so that when actuated rotational motor movement is converted into a coordinated level lifting motion of printing support frame 62. Frame 62 includes a plurality of slots 70 to fixedly hold printheads above each tunnel 44 and a fixed rearward placed slot 71 for a UV curing lamp.

Movement of each pinning lamp 58 is achieved via a coordinated assembly of extendable plates and pivotal support bars and brackets 75. Pinning UV lamps 58 are supported by a parallel series of transverse support bars 52 that adjustably hold lamps in pre-formed slots and held in place with retaining screws. Each support bar 52 is supported at its ends by brackets 53 and 54 which in turn are supported by connecting plates 61 so that pinning lamps 58 are slidably suspended above each piece of media across and above each tunnel 44. End plates 61 are slidable held in slots formed in frame 62 so that as left most plates 61 are moved by gear 47 through gearing assembly 74, the pair of brackets 53 and 54 are moved right or left, depending upon the rotational direction of drive shaft 73 driven by servo motor 72. Brackets 53 and 54 are connected to support bars 52 via rotatable studs or fasteners 46 so that as the lateral position of brackets 53 and 54 are changed, bars 52 are correspondingly moved laterally. When actuated, servo motor 72 thereby precisely controls the lateral position of the UV lamps 58 relative to an underlying piece of media 20 positioned within tunnels 44. The lateral position of brackets 53 and 54 are also adjustable relative to one another so that as bracket 53 is advanced to the right or left relative to lower bracket 54, bars 52 are tilted about a rotational axis corresponding with the center of the lower positioned rotatable studs 46a. Therefore, changing the lateral relative positions of brackets 53 and 54 alters the angle 79 of each UV emitter 58 identically with every other UV emitter 58. A spring-loaded set pin 49 locks the relative lateral position of each bracket 53 and 54 relative to one another, and upon pulling pin 49 out slightly the two brackets may be altered relative to one another to change angle 79 as desired. A series of pin indentations or holes within right most plate 61 allow for the selection and locking of one or more pre-set angles for emitters 58 by grasping and manipulating pin 49 and rotating the UV emitters to a desired angle. The lateral position is attained by actuating motor 72 by an operator and, in the present embodiment, the angle of the UV lamps 58 is adjusted by manipulating pin 49 to allow movement and locking of emitters 58 into a desired angle relative to the adjacent printheads 57 and underlying media 20.

Importantly, the above described selectable positioning of UV lamps 58 in relation to the position of the media 20 and printheads 57 minimizes the potential for UV exposure to each printhead, either directly or via transparent media reflections, as will be further discussed. As may also be noticed, the final cure UV lamp 59 is positioned well behind each bank of inkjet printing heads 57, but the UV pinning lamps 58 are positioned adjacent to each bank of printheads 57 and pointed downward and away from the bottom ink expression area (i.e. the printhead nozzle) of each printhead.

Referring again to FIG. 6, printing carriage 28 is moved along path 43 and into tunnels 44. As each piece of media moves into its own respective tunnel, the media is rotated, and the surface of the media is moved axially under each printhead 57 in a coordinated fashion. As a piece of media traverses under a print head the lateral position and rotation speed of the media is precisely controlled via spindles 42 and a drive motor causing movement of printing carriage 28 via a screw shaft 48 (not shown). In addition to being rotationally controllable, spindles 42 are self-stripping and are locked against each piece of media via air cylinders at one end, but having a spring-loaded configuration thereby clamping each piece of media within the print carriage 28 at the center of each individual media spindle.

As may be understood, the disclosed embodiment shows a material handling system 11 mated to printer 12 so that the disclosed configuration allows for the automation of material handling. However, printer portion 12 may be utilized separately without the automation system 11 in which case an operator would simply load each piece of media 20 directly onto printer carriage 28 by manually manipulating the spindle ends to insert a piece of media 20 for decorating within each spindle and removing a decorated piece of media 30 when complete.

For the purposes of discussions on the operation of the herein described printing and ink partial curing and final curing steps, a suitable ink delivery and print engine subsystem 45 may be found in U.S. patent Ser. No. 10/710, 378B, at Col. 6, lines 12-47; Col. 7, lines 6-12; Col. 12, line 33 through Col. 13, line 26; and FIG. 4 (commonly owned by the Applicant), all of which is hereby incorporated by reference. Referring to FIG. 8 along with Table 1 below, a power scale factor formula is presented that allows for the calculation of the minimum amount of power such that a final acceptable UV cure dosage amount may be applied to the partially cured ink present on the surface of the (now) decorated media 30. As an article having a partially cured or "pinned" image 96 traverses further within a respective tunnel 44 along path 43, it enters into an illumination zone 91 concordant with the length (91a) of UV cure lamp 59 as the object 20 continues to rotate 97 at a known speed. Each lamp has a known width 88 and a known power density as set by its manufacture. Also, each type of ink deposited onto the surface of the object 20 also has a specified amount of UV energy necessary to optimally cure the ink, which is either supplied by the manufacture of the ink or can be obtained relatively easily by empirical testing.

TABLE 1

$$\text{Power Scale Factor} = \frac{\begin{pmatrix} \text{(Rotational Speed of Media)} \times \\ \text{(Step Distance per Media Revolution)} \times \\ \text{(Media Perimeter)} \times \text{(Dose density)} \end{pmatrix}}{\begin{pmatrix} \text{(Distance of Exposure)} \times \\ \text{(Power Density of UV Lamp)} \times \\ \text{(Lamp Width)} \end{pmatrix}}$$

Where:
Rotational Speed=Revolutions per Second;
Step Distance=mm per revolution that the media moves laterally along its axis of rotation during partial curing (element 43 in FIGS. 11A and 13A-13B);
Media Perimeter (i.e. Object Circumference at Image Printing Location on Object Surface)=π×D in mm;
Dose Density=m Joules per cm² as determined by an ink manufacture specification or empirical testing;
Distance of Exposure=The Lesser of the expressed Image Height or Lamp Length in mm;
Power Density=mW per cm².

The Power Scale Factor or "PSF" in Table 1 is a dimensionless value and often is simply a scaling factor or a percentage of the maximum power density. Given the amount of energy required to cure the deposited ink and given the known amount of UV energy emitted by lamp 59, a power scale factor or PSF may be calculated using empirical UV dosage results so that the PSF may be utilized for future print jobs. This allows for the variation of various factors during printing to obtain optimal image quality on the exterior of the object 20. For example, if 20% of total dosage during pinning of an image 96 is applied, the lateral speed along path 43 and rotational speed 97 may be varied to accommodate a particular beam strength emitted from lamp 59 to achieve the remaining optimal dosage of 80%. Lamp width 88 is typically small (e.g. 20 mm) relative to the circumference of an object 20 such that redundant image exposure may be ignored. Further, each lamp 59 may include a collimator to reduce the fanning or scattering of illumination zone 91 prior to impinging upon the surface of object 20.

Another way to express the above PSF is with the following formula shown in Table 1A below:

TABLE 1A $$\text{Power Scale Factor} = \frac{\text{(UV Doseage Applied to Expressed Image During Partial Curing)}}{\text{(Time of Exposure)} \times \text{(Power Density of the UV Lamp)}}$$

Where:
the UV Dosage Applied represents the total amount of UV energy applied over the expressed image in m Joules;
the Time of Exposure represents the total amount of time in seconds that the expressed image is exposed within the UV illumination zone 91 (See FIGS. 11A-12B); and,
the Power Density of UV Lamp represents the total power output in the partial curing lamp in mW per cm2.

As may be understood, for non-3D objects, such as flat media, the Time of Exposure may be found by dividing the distance of travel of the media under a lamp with the linear velocity of the flat media. However, for 3D objects that require rotation such as media described herein, the time of exposure is the fraction of the time that the UV illumination zone 91 is incident with the expressed image applied to the surface of the media along the perimeter or circumference of the media.

Using the formula shown in Table 1, an example PSF calculation is shown below.

Given a color ink curing dose density of 146 mJ/cm² an example calculated PSF would be:

$$PSF = \frac{(8 \text{ rev./sec.}) \times (5 \text{ mm/rev.}) \times (238.7 \text{ mm}) \times (146 \text{ mJ/cm}^2)}{(40 \text{ mm Lamp Length}) \times (8000 \text{ mW/cm}^2) \times (20 \text{ mm})} = .218 \text{ or } 22\%$$

FIG. 9 shows an altered final cure step 101 to reduce the amount of UV radiation utilized in a final cure step. As object 20 moves under lamp 59, the trailing edge of image 102 (i.e. the last part of an image that must be cured as the object moves from left to right and under the cure lamp within tunnel 44) moves under lamp 59 and at some distance 103 becomes fully cured. The remaining distance under lamp 59 thereby becomes superfluous for the purpose of curing. Therefore, lamp intensity may be increased during a last portion of lateral travel 103 to finish full curing of the image 96 and then lateral movement stopped rather than moving the object the full length of the image underneath lamp 59. This procedure thereby reduces the time of printing while also reducing the amount of duration of any potentially scattered light within tunnel 44. As can be appreciated, a full number of turns under the emitter must be realized in order that all parts of image 96 receive the same minimum amount of UV radiation so that full curing is achieved. Table 2 below shows a formula for calculating the minimum number of turns required in order to achieve full curing.

TABLE 2

$$\text{No. of Turns} = \frac{\text{(Rotational Speed of Media)} \times \text{(Perimeter of Media)} \times \text{(Dose density)}}{\text{(Lamp Width)} \times \text{(Power Density of UV Lamp)}}$$

An example calculation is shown below calculating the minimum number of turns required for the specified equation values per Table 2. Given a 3D media having a circumference of 238.7 mm at the image location on the media, the following calculation leads to a minimum number of two (2) full turns to achieve full curing of image 96.

$$\textit{No. of Turns} = \frac{(8 \text{ rev./sec.}) \times (238.7 \text{ mm}) \times (146 \text{ mJ/cm}^2)}{(20 \text{ mm Lamp Length}) \times (8000 \text{ mW/cm}^2)} = 1.74 = 2$$

Figure 10:
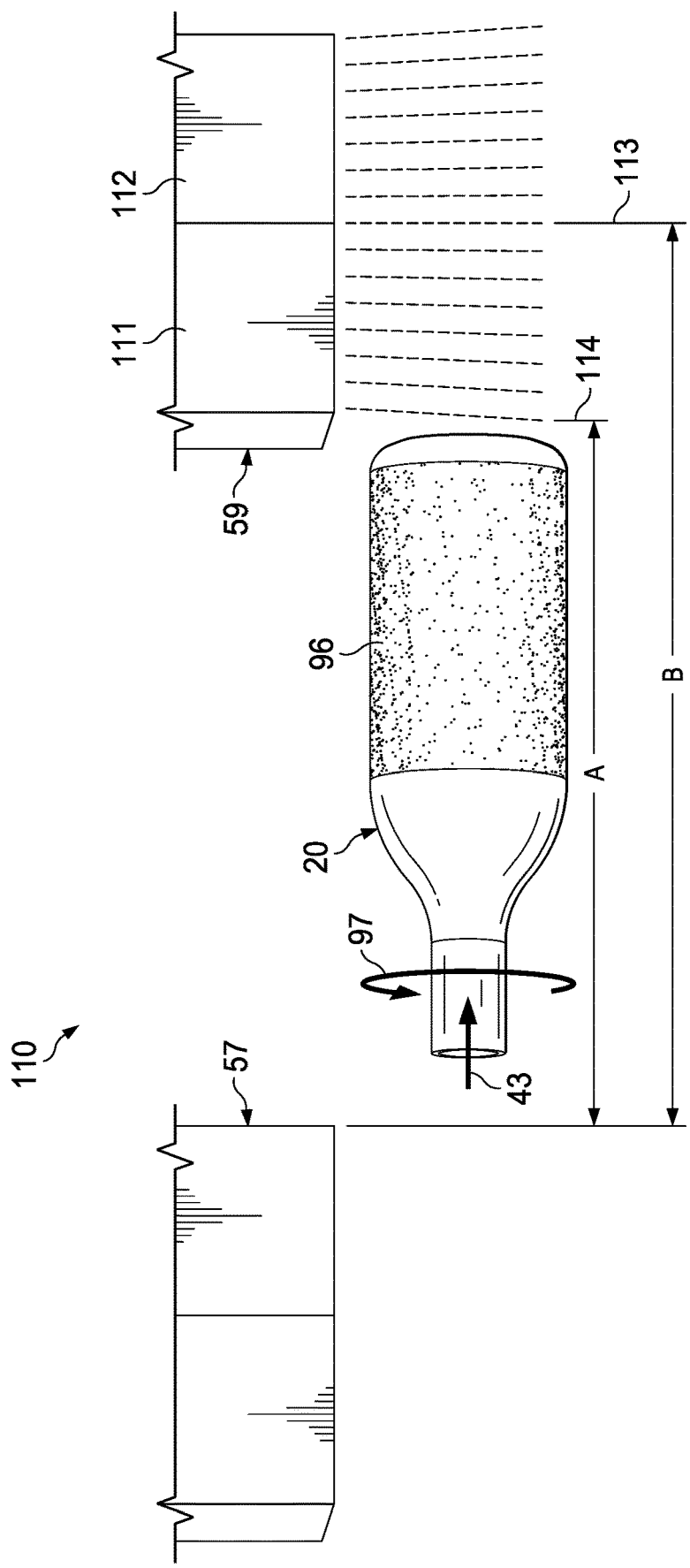
FIG. 10 is a further diagrammatic view of a portion of the final cure steps providing an option to minimize UV radiation scattering within the printing portion of the decorating machine.

FIG. 10 provides a further final cure option 110 for clear media. Lamp 59 includes left and right lighting segments 111, 112. For clear media, left segment 111 is deactivated and only right segment 112 utilized for curing of ink on image 96, thereby removing the UV illumination field portion between location 114 and 115. This re-positions the UV source of light in tunnel 44 to the right and moving a potential source of scattered stray UV light away from ink heads 57. This option is selected through an operator inputted action via the HMI prior to the start of any print job.

Figure 11A:
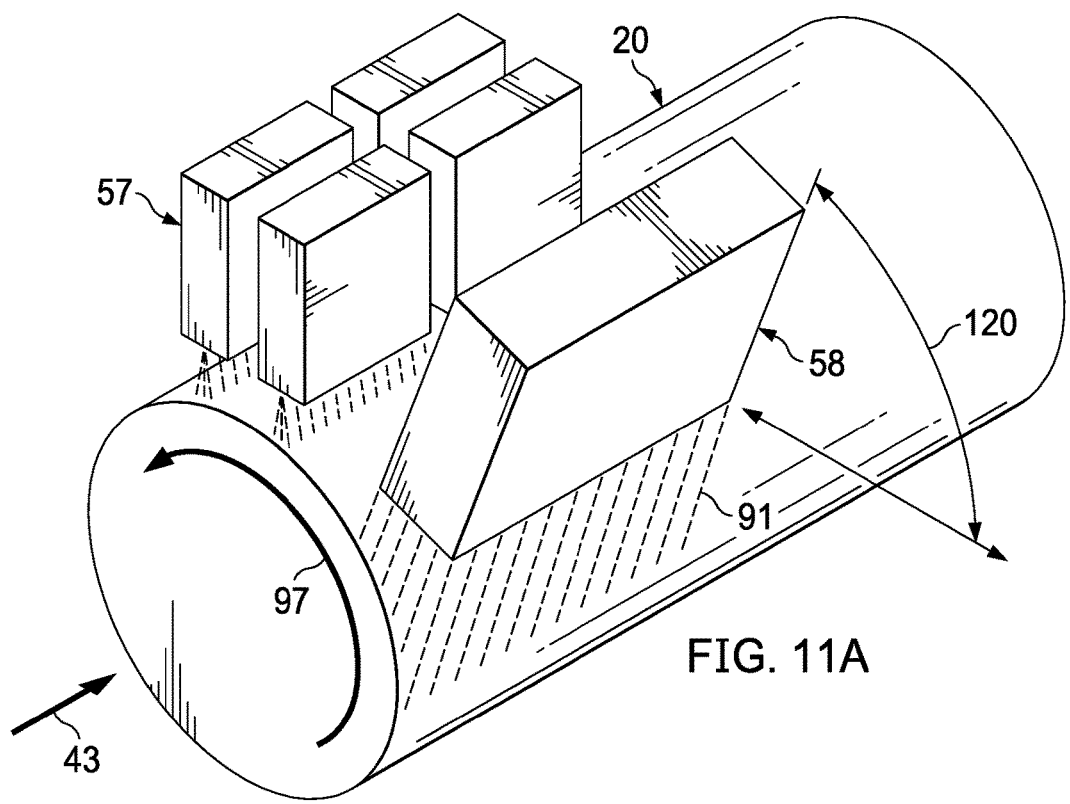
FIG. 11A is diagrammatic perspective view of the arrangement of a bank of ink printing heads in relation to an adjustable UV pinning lamp above a rotating piece of media.
Figure 11B:
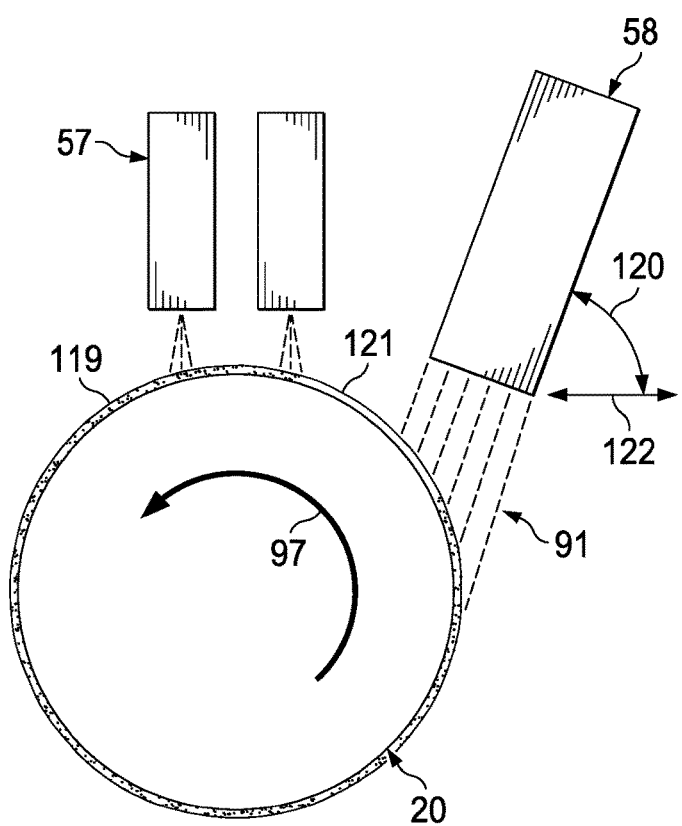
FIG. 11B is a diagrammatic elevational view of the arrangement of a bank of inkjet printing heads in relation to an adjustable UV pinning lamp above a rotating piece of media.
Figure 12A:
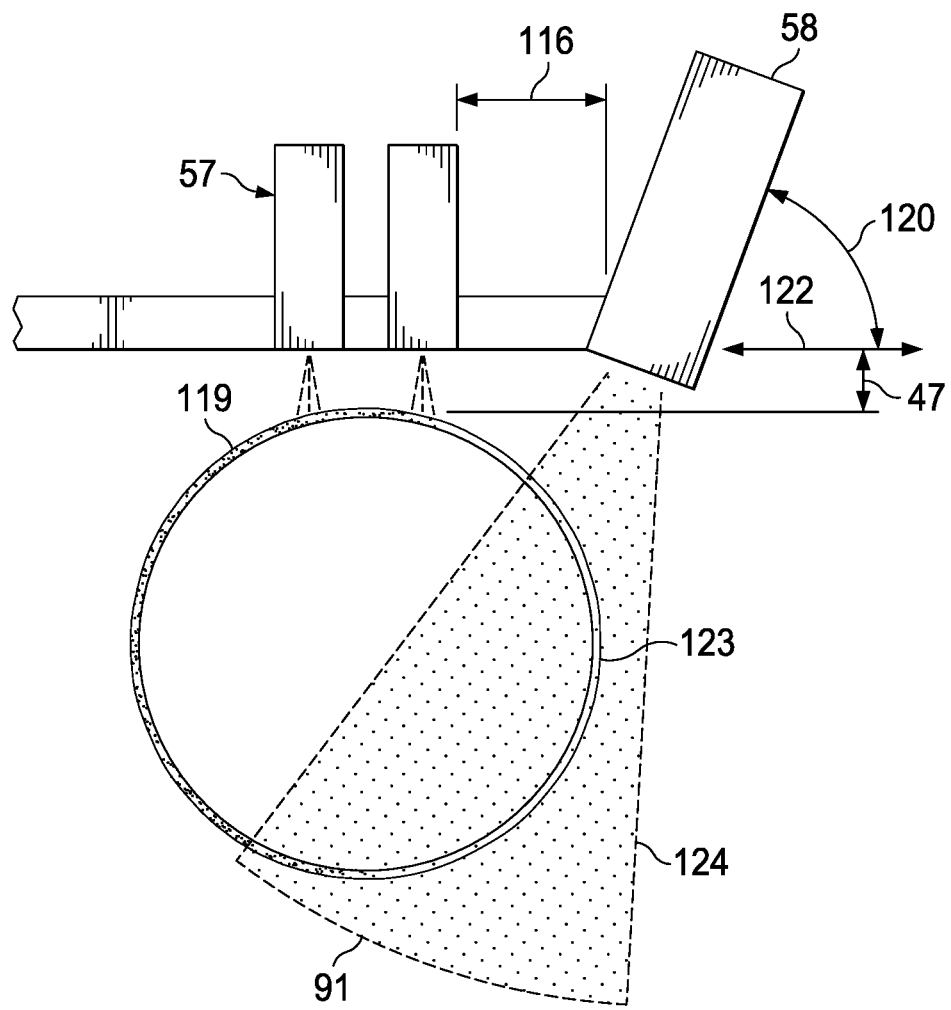
FIG. 12A is a diagrammatic view of the arrangement of a bank of inkjet printing heads in relation to an adjustable UV pinning lamp above a rotating piece of media showing a substantially wedge-shaped zone of UV illumination.

Referring now to FIGS. 11A-11B, and 12, it may be seen the positioning of pinning lamps relative to the printheads 57 within each tunnel 44. The adjustment of the pinning lamp position 78 is accomplished as discussed above with respect to FIGS. 7A-7F and may be controlled through an HMI presented to an operator through a display held by display mounting 24. The HMI displays the settings required for any selected piece of media and the operator makes whatever adjustments to the printer 12 that are required, including for example the lateral position of the pinning lamps, the tilt or angle of the pinning lamps in relation to the adjacent print heads, and the height of the frame member 62 over the media responsive to the diameter of the media. UV light emitted from lamp 58 is angled such that the right most edge 124 of illumination zone 91 preferably coincides with the tangential edge 123 of object 20 as it rotates 97 in a counterclockwise direction. The alignment of the right most zone edge 124 with the object edge 123 allows for the maximum emitted amount of UV light to be received on the rotating surface of the media 20 within the illumination zone 91. Further, zone 91 is optionally refined to align the emitted UV light rays with a collimator placed on lamp 58 to further reduce scattering. As shown, wet ink 119 is jetted or expressed by printhead bank 57 onto the surface of object 20 as the object rotates counter-clockwise. The wet ink 119 is then exposed to UV light when it reaches illumination zone 91 and partially hardens into a gel 121 so that the applied ink does not shift on the surface of the media 20 during further printing. This arrangement allows for the wet ink to fully spread or "wet" the surface of object 20 prior to exposure to UV radiation in zone 91. As the media rotates the slight rotational delay prior to exposure in zone 91 is important because it allows for a better artistic expression of the applied image. For example, the rotational delay allows for a more glossy, desirable image 96 to be applied to the object 20 when fully cured. Referring to FIG. 12A, clear media will expose ink to UV radiation below the potential tangency point 123 when the UV radiation passes through the clear media material, but given the rotational delay until exposure the point of UV impingement is sufficiently delayed to allow for full wetting of ink on the surface of a clear media object 20 to occur. Further, the downward UV light ray angle minimizes or even eliminates reflections on clear media so that printhead impingement does not occur. For translucent media, ink is exposed at the point of tangency 123 on the media with light scattering away from the ink heads 57 to avoid impingement. Critically, the downward angle of lamp 58 avoids UV light from impinging onto the nozzles of ink heads 57 on either type of media, thereby avoiding the fouling and deactivation of ink heads 57 during a print job when clear or semi-transparent media are being decorated. As shown, angle 120 of lamp 58 and the lateral position 116 along path 122 of lamp 58 may be adjusted in response to a geometry file associated with the dimensions of object 20 in order to optimize the positioning of lamp 58 so that the right most edge 124 of illumination zone 91 coincides with the tangency point 123. This maximizes the amount of pinning UV radiation applied to the widest possible portion of media 20 without exposing ink heads 57 to UV light, even when clear media are being printed upon with the associated potential reflections of UV light.

Figure 12B:
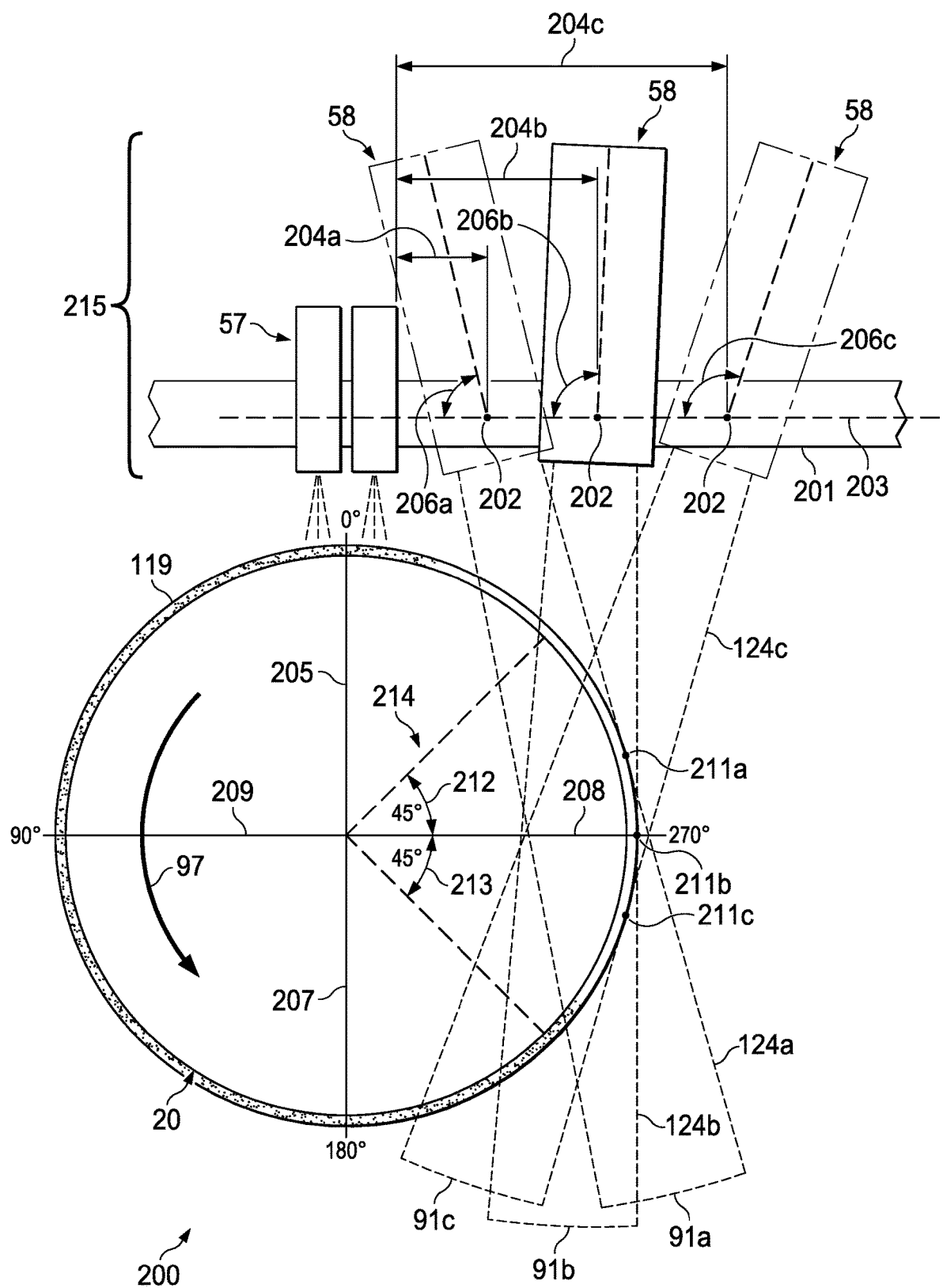
FIG. 12B is a view showing various positional arrangements of the pinning UV lamp in relation to the media and the inkjet printing heads, and the effect of such positions to create zones of UV illumination.

Referring to FIG. 12B, it may be seen various positional embodiments 200 of UV lamp 58 and the effect of such positional changes on the UV illumination of rotating media 20. Inkjet print heads 57 express ink onto the surface of media 20 in a wet condition 119 as media 20 rotates counterclockwise 97. During rotation, the surface of media 20 rotates into various angular zones demarked by angles of 0 degrees 205, 90 degrees 209, 180 degrees 207, and 270 degrees 208, thereby creating four angular quadrants of 90 degrees each. A preferred illumination area 214 may also be seen consisting of plus or minus 45 degrees (212, 213) from angular point 270 degrees 208.

In relation to inkjet printing heads 57, UV pinning lamp 58 may be moved into various lateral and angular positions 215 thereby altering the position of illumination field 91 issuing from lamp 58. As previously described, inkjet heads 57 and UV lamps 58 are supported by frame member 62 but also extend just below the lower surface 201 of frame member 62 so as to interact with each piece of media 62 when inside tunnels 44 during a printing operation. Lamp 58 may be adjusted to move laterally away from printheads 57 along line 203 to various a user selected distances 204(a-c) as measured from the edge of printheads 57 to a center pivot point 202 for lamp 58. Pivot point 202 corresponds with retaining grommet 46a (see FIG. 7F) to allow lamp 58 to be rotated into various user selected angles 206(a-c) as measured from a line bisecting lamp 58 and intersecting pivot point 202, thereby forming an angle 206 with line 203. Line 203 is parallel with lower surface 201 and also intersects pivot point 202 as shown. Angles thus formed may range preferably from approximately 70 degrees 206a, 95 degrees 206b, or 120 degrees 206c. As will be understood, by varying the lateral and angular position of lamp 58, a UV illumination zone or field having various coverage areas 91(a-c) relative to media 20 may be created. Each field has a right most illumination edge 124(a-c) that varies with angle and lateral position such that intersection with ink layer 119 on the surface of media 20 creates a tangency point 211(a-c) at the intersection location. Each tangency point varies in relation to the lamp position, but is preferably located within preferred angular zone 214 that maximizes the amount of power impinging upon the ink 119 during rotation while minimizing any potential for reflectivity of UV light to intersect the nozzles on printheads 57. For example, for the media size depicted in FIG. 12B, a preferred position of lateral distance 204b is combined with an angular position of 206b to produce an illumination field of 91b. UV light will therefore partially harden ink 119 as is passes through field 91b, including tangency point 211b and keeping wet ink 119 within zones 212 and 213 until gelled. By adjusting the lateral and angular position of lamp 58, a large range of media sizes and various types of inks may be accommodated within printer 12 without fouling the ink nozzles of the printheads 57 during printing.

FIGS. 13A-13B show the application of exposure control so as to minimize reflections of UV light during final cure by modulating different banks of emitters in lamp 59 or by modulating the power level of all emitters in lamp 59 (FIG. 13B). FIG. 13A shows the traditional method in which the entire 3D object is moved under a curing lamp for the entire length of the object resulting in the gross scattering of UV radiation 126, likely in a direction toward a printhead 57. The same traditional approach shown in FIG. 13A applies with a UV curing lamp emitter positioned underneath the object, which is the most common industry position standard for final curing of ink on 3D objects. FIG. 13B shows the improved, modulated approach. Two levels of intensity are used for lamp 59. While an image is being printed and pinned onto the surface of object 20, the entire object is moving into illumination zone 91. As image leading edge 132 enters the start of the illumination zone 131, intensity of lamp 59 is set at a value less than full value, for example 50% of full illumination strength, but modulated to an intensity value responsive to a final UV exposure value calculated in accordance with the PSF value to achieve complete curing. Object 20 continues to move forward into the illumination zone 91 along path 43. Once image 96 has been fully printed and pinned, the intensity of lamp 59 is increased to full power, or other second higher power depending about size and length of the image and lamp intensity, and again in accordance with the PSF value. The object continues through the illumination zone 91 until the left trailing edge 133 of image 96 attains a fully cured state. Since final cure lamp 59 does not use a full power level until after image 96 is fully printed, the total amount of UV light emitted by the cure lamp 59 is greatly reduced thereby reducing the amount of stray UV light at a high-power level being potentially scattered around the printing tunnel 44 during final curing of the media 20. Since many types of transparent or translucent media include concave and convex surfaces, like for example a smooth, curved neck surface, this UV power reduction process minimizes the potential for a concentrated beam of UV light impinging upon a print head, or if it does it would do so at a reduced UV effect.

Figure 14:
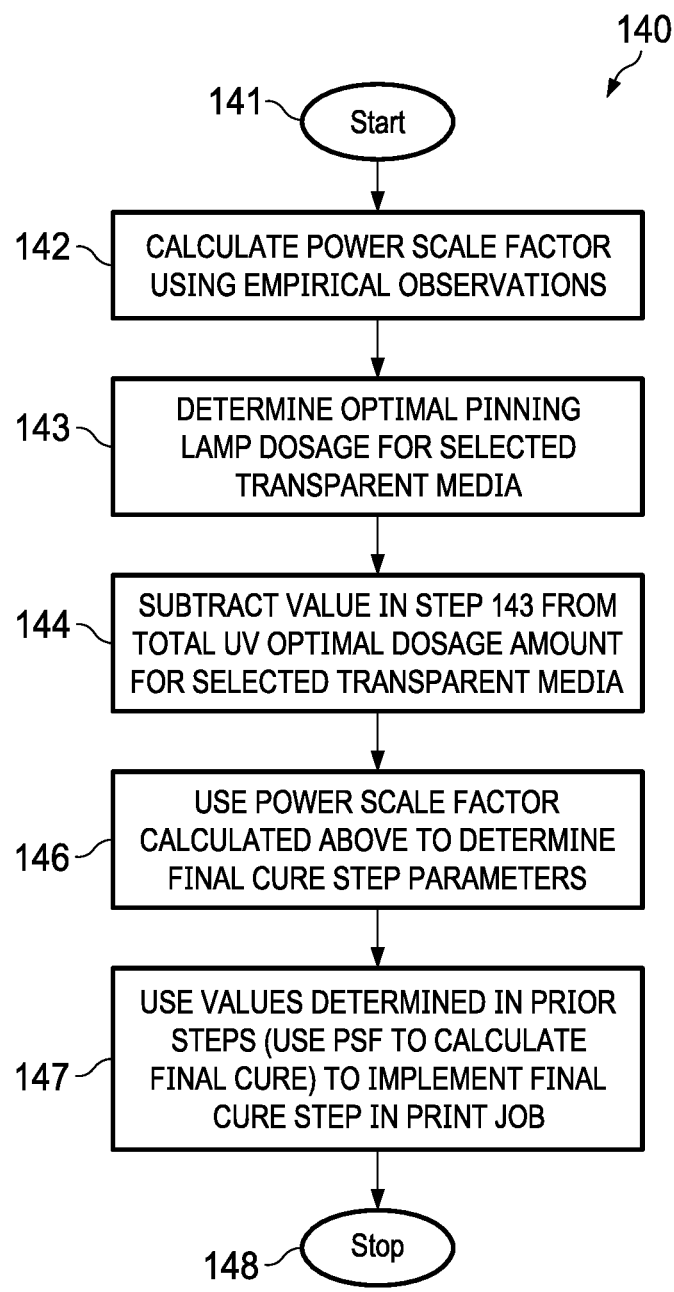
FIG. 14 is a flow diagram of using a power scale factor calculation for a final cure step in the disclosed decorating machine.

FIG. 14 shows a process 140 for using the PSF formula shown in Table 1 to control values in the printing process for the system 10. The process starts 141 by calculating a PSF by using empirical observations 142. Using the PSF value, an optimal pinning lamp dosage value is determined 143 for the transparent media 20 upon which an image is to be applied. The value calculated in step 143 is then subtracted from the total optimal UV dosage amount required to fully cure the image onto the surface of the media 144. The PSF is further used to determine the final cure step parameters 146 which are then used to implement a final cure in the print job for a piece of media 147, which ends the printing of a piece of media 148. For example, an optimal media rotational speed for the printing of a piece of media in the printer can be calculated as follows:

Rotational speed=(PSF×Distance of Exposure×Power Density of lamp×Lamp Width)/(Step Distance per Rev×Perimeter of Media×Dose Density)

Therefore:

Rotational speed=(0.25×40 mm×8000 mW/cm2×20 mm)/(5 mm/Rev×238.7 mm×146mJ/cm2)=9.1 Rev/s or less to produce a satisfactory full cure.

Figure 15:
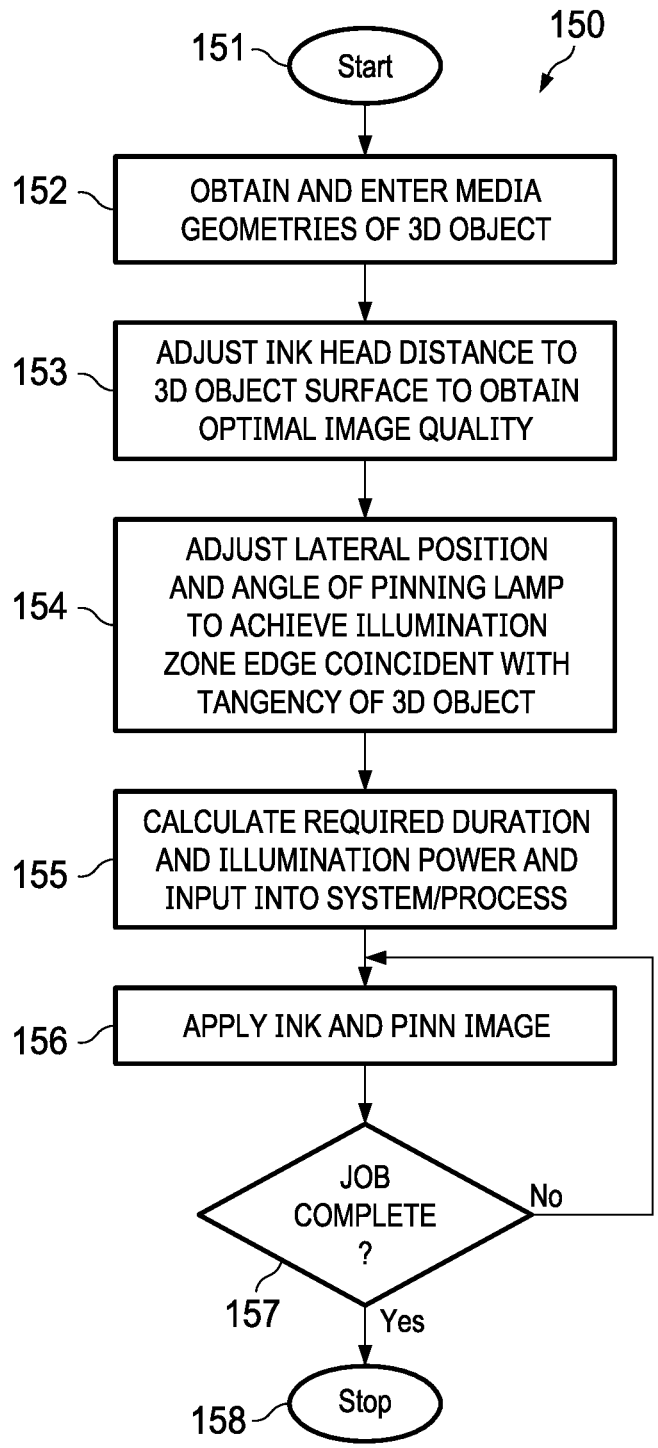
FIG. 15 is a flow diagram of a UV pinning lamp configuration process for pinning an image onto the exterior of a 3D object in the disclosed system; and, FIG. 16 is a flow diagram of a process for minimizing UV radiation reflections during final curing of an image on the exterior of a 3D object in the disclosed decorating system.

FIG. 15 shows the process steps for adjusting the machine 10 for use on a particular 3D media shape in order to realize the reduced printhead fouling characteristics of the herein described system in a print job. Process 150 starts 151 by obtaining the 3D object geometries 152 by either taking manual measurements of the object and inputting those values into the system HMI or by reading into the system a geometry file that specifies the geometry values representing the object from a recipe file provided for the object and its assigned image to be applied. Responsive to the geometries for the object, the height of the printheads 57 held in slots 70 is adjusted 153 up or down along path 77 via commands issued to motor 63 to raise of lower printer support assembly 60. The distance is adjusted 153 so that the printheads are optimally spaced 117 from the surface of the media to obtain the best image quality on the surface of the 3D object. Responsive to the diameter of the object, the lateral position 78 and angle 79 of the UV pinning lamp 58 is adjusted 154 relative to the central rotational axis of the media 20 in order to position the pinning lamp illumination zone edge to be coincident with the tangency 123 of the rotating 3D object surface (see FIG. 12). Using the formula for the PSF shown in Table 1, the required duration and illumination power for the pinning lamps 58 is calculated and set 155 to control the rotation rate of the media, the lateral advancement 43 and travel speed of printing carriage 28 in system 10. The ink representing an image 96 is applied and rotates into the illumination zone 91 to become gelled or "pinned" onto the surface of the object 156. This process of repeatedly applying and pinning an image onto an object surface is repeated until the print job is complete 157 and stopped 158.

Figure 16:
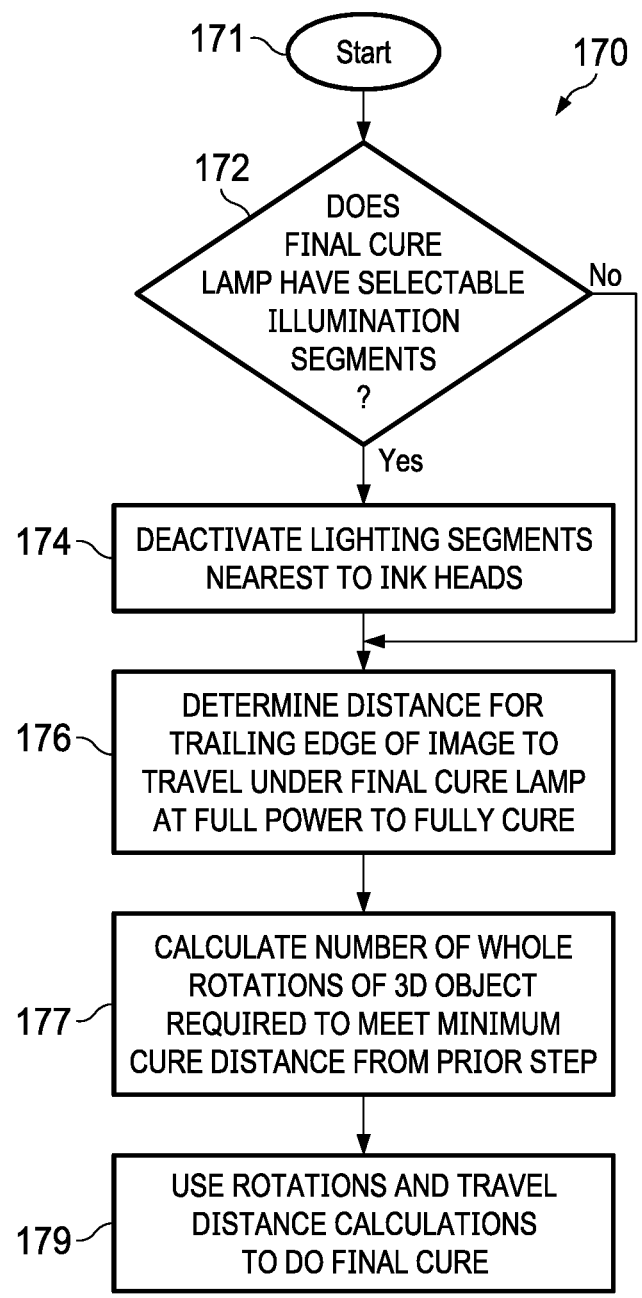

FIG. 16 shows process steps for adjusting the functionality of a final cure lamp to reduce the potential for printhead fouling 170. Some cure lamps 59 utilize one or more parallel segments of LED (light emitting diodes) on their illumination surface of the lamp. For those types of lamps, the printing process of system 10 starts 171 by checking to see if the final cure lamp incorporates selectable LED segments 172. If it does, segments closest to the ink printhead are deactivated 174 in each lamp 59. If the lamp does not include selectable segments, step 174 is skipped. Then, the distance for the trailing edge of the pinned image 96 to travel under the final cure lamp when the lamp is set at full power to fully and optimally cure is determined 176. The number of whole rotations of the 3D media to meet the minimum cure distance from step 176 is calculated 177 using the formula shown in Table 2. The values calculated in steps 176 and 177 are then used to implement the final cure set in the system 179. For example, assuming a non-de-activatable LED final cure lamp of 80 mm (versus a segment selectable lamp having two 40 mm segments), a calculated PSF equals [(8 rev/s×5 mm/rev×238.7 mm×143 mJ/cm$^2$)/(800 mm lamp length×8000 mW/cm$^2$×20 mm)=0.11 or 11%]. Therefore, the number of turns required equals [(8 rev/s×238.7 mm×146 mJ/cm$^2$)/(20 mm×8000 mW/cm$^2$)=1.74 turns], which would be rounded to the next higher integer of two (2) turns to ensure even image coverage. If an operator utilizes a less powerful lamp, for example 4000 mW/cm$^2$, the PSF would then double to 0.21 and the number of turns would increase from two (2) to four (4) turns.

While I have shown my invention in one form, it will be obvious to those skilled in the art that it is not so limited but is susceptible of various changes and modifications without departing from the spirit thereof.

Having set forth the nature of the invention, what is claimed is:

1. A process for utilizing a power scale factor to control curing of an inked image applied to the surface of a 3D object transparent media, comprising the steps of:
   a. establishing a UV dosage energy amount to optimally cure an expressed image applied onto the exterior of a 3D object transparent media, wherein said step of establishing said optimal UV dosage amount comprises recursively applying UV light energy to said 3D object transparent media exterior painted with a UV curable inked image until the entirety of said ink in said image hardens to a permanence level optimized for longevity without sacrificing appearance, and recording said UV light energy amount;

b. expressing said image onto the exterior of a piece of 3D object transparent media while rotating said media;

c. exposing the exterior of said 3D object transparent media to a UV cure lamp while rotating and moving said media along its rotational axis in proximity to said cure lamp until said expressed image partially cures into a gelled state;

d. calculating a percentage of said recorded optimal UV dosage amount applied to said 3D object media during said partial curing step;

e. moving said 3D object media along its rotational axis into proximity to a UV curing lamp and exposing said expressed image to UV light to achieve final curing of said image on said media; and, f. wherein said final curing step comprises the step of reducing said recorded UV optimal dosage energy amount by the calculated percentage of energy applied during said partial curing step and applying said reduced UV energy amount to said 3D object transparent media during said final curing step.

2. A process for utilizing a power scale factor to control curing of an inked image applied to the surface of transparent media, comprising the steps of:

a. establishing a UV dosage energy amount to optimally cure an expressed image onto the exterior of transparent media;

b. expressing an image onto the exterior of said media while rotating said media;

c. exposing the exterior of said transparent media to a UV cure lamp while rotating and moving said media along its rotational axis in proximity to said cure lamp until said expressed image partially cures into a gelled state;

d. calculating a percentage of said UV optimal dosage amount applied to said media during said partial curing step;

e. moving said media along its rotational axis into proximity to a UV curing lamp and exposing said expressed image to UV light to achieve final curing of said image on said media; and, f. wherein said final curing step is tailored responsive to said calculated optimal percentage step such that said established UV optimal dosage energy amount is substantially met, and wherein said tailoring step is based upon a power scale factor calculated in accordance with the formula:

$$\text{Power Scale Factor} = \frac{\begin{array}{c}(\text{Rotaional Speed of Media}) \times \\ (\text{Step Distance per Media Revolution}) \times \\ (\text{Media Perimeter}) \times (\text{Dose density})\end{array}}{\begin{array}{c}(\text{Distance of Exposure}) \times \\ (\text{Power Density of UV Lamp}) \times \\ (\text{Lamp Width})\end{array}}$$

where Rotational Speed of Media represents the rotational speed of said media in revolutions per second during said partial curing step;

where Step Distance per Media Revolution represents the distance that the media traverses along its rotational axis during said partial cure step during each revolution of said media in mm per revolution;

where Media Perimeter represents the circumference of said media at the location of the expressed image on the surface of said media measured in mm;

where Dose density represents the determined optimal dosage power density in m Joules per cm2 for the expressed image;

where Distance of Exposure represents the lesser of the maximum image height as measured along the axis of rotation of said media and the curing lamp length in mm;

where Power Density of UV Lamp represents the total power output in the curing lamp in mW per cm2; and, where Lamp Width represents the curing lamp width in mm.

3. The process as recited in claim 2, wherein said step of tailoring said final curing step comprises the step of reducing the amount of energy that is emitted by a final cure lamp.

4. The process as recited in claim 3, wherein said step of tailoring said final curing step comprises the step of adjusting the lateral movement speed of said media along its axis of rotation as said media is exposed to energy that is emitted by a final cure lamp.

5. A process for utilizing a power scale factor to control curing of an inked image applied to the surface of transparent media, comprising the steps of:

a. establishing a UV dosage energy amount to optimally cure an expressed image onto the exterior of transparent media;

b. expressing an image onto the exterior of said media while rotating said media;

c. exposing the exterior of said transparent media to a UV cure lamp while rotating and moving said media along its rotational axis in proximity to said cure lamp until said expressed image partially cures into a gelled state;

d. calculating a percentage of said UV optimal dosage amount applied to said media during said partial curing step;

e. moving said media along its rotational axis into proximity to a UV curing lamp and exposing said expressed image to UV light to achieve final curing of said image on said media;

f. wherein said final curing step is tailored responsive to said calculated optimal percentage step such that said established UV optimal dosage energy amount is substantially met and, wherein said tailoring step is based upon a power scale factor calculated in accordance with the formula:

$$\text{Power Scale Factor} = \frac{(\text{UV Dosage Applied to Expressed Image During Partial Curing})}{(\text{Time of Exposure}) \times (\text{Power Density of the UV Lamp})}$$

where UV Dosage Applied represents the total amount of UV energy applied over the expressed image during said partial curing step in m Joules;

where the Time of Exposure represents the total amount of time in seconds that the expressed image is exposed within a UV illumination zone during said partial curing step; and, where Power Density of the UV Lamp represents the total power output of a curing lamp used in said partial curing step in mW per cm2.

6. The process as recited in claim 5, wherein said step of tailoring said final curing step comprises the step of calculating a number of rotations that said media is exposed to UV energy emitted by a final cure lamp and adjusting the number of total rotations of said media during said final cure step to comport with said calculated number of rotations.

7. The process as recited in claim 6, wherein said steps of expressing an image and partially curing said expressed image are iteratively repeated in order to apply additional layers of ink to said media surface.

8. A process for utilizing a power scale factor to control curing of an inked image applied to the surface of transparent media, comprising the steps of:
   a. establishing a UV dosage energy amount to optimally cure an expressed image onto the exterior of transparent media;
   b. expressing an image onto the exterior of said media while rotating said media;
   c. exposing the exterior of said transparent media to a UV cure lamp while rotating and moving said media along its rotational axis in proximity to said cure lamp until said expressed image partially cures into a gelled state;
   d. calculating a percentage of said UV optimal dosage amount applied to said media during said partial curing step;
   e. moving said media along its rotational axis into proximity to a UV curing lamp and exposing said expressed image to UV light to achieve final curing of said image on said media;
   f. wherein said final curing step is tailored responsive to said calculated optimal percentage step such that said established UV optimal dosage energy amount is substantially met and,
      wherein said tailoring step comprises the steps of;
      i. calculating the amount of UV energy applied to said expressed image during said partial curing step;
      ii. subtracting said calculated partial curing UV energy value from said established a UV dosage energy amount necessary to optimally cure said expressed image applied to said media;
      iii. adjusting the amount of UV energy applied to said gelled image in said final cure step to match the value obtained in said UV energy subtraction step.

9. The process as recited in claim 8, wherein said of step calculating the amount of UV energy applied to said expressed image during said partial curing step comprises the steps of:
   a. calculating a ratio of media surface being illuminated within a UV illumination zone by a partial cure lamp by dividing the width of the partial curing lamp by the circumference of the media at the location of the image on the media;
   b. calculating the linear velocity along the axis of rotation of the media moving beneath a cure lamp by multiplying the rotational speed of the media by the linear distance the media moves during a single rotation;
   c. calculating the time of exposure of the leading edge of the image as it passes through a cure lamp zone of illumination by dividing the distance traveled through the cure lamp zone of illumination by the calculated linear velocity;
   d. calculating the total amount of UV energy applied to an image expressed onto the surface of the media by multiplying the calculated time of exposure with the power density of the partial curing lamp; and,
   e. multiply the prior calculated ratio of media surface being illuminated with the calculated the total amount of UV energy applied to the image.

10. The process as recited in claim 9, wherein said step of tailoring said final curing step comprises the step of reducing the amount of energy that is emitted by a final cure lamp.

11. The process as recited in claim 9, wherein said step of tailoring said final curing step comprises the step of adjusting the rotational speed of said media when exposed to energy that is emitted by a final cure lamp.

12. The process as recited in claim 11, wherein said step of tailoring said final curing step comprises the step of adjusting the lateral movement speed of said media along its axis of rotation as said media is exposed to energy that is emitted by a final cure lamp.

13. The process as recited in claim 12, wherein said steps of expressing an image and partially curing said expressed image are iteratively repeated in order to apply additional layers of ink to said media surface.

14. The process as recited in claim 9, wherein said step of tailoring said final curing step comprises the step of calculating a number of rotations that said media is exposed to UV energy emitted by a final cure lamp and adjusting the number of total rotations of said media during said final cure step to comport with said calculated number of rotations.

15. A process for utilizing a power scale factor to control curing of an inked image applied to the surface of a 3D object transparent media, comprising the steps of:
   a. step for establishing a UV dosage energy amount to optimally cure an expressed image applied onto the exterior of 3D object transparent media, wherein said step of establishing said optimal UV dosage amount comprises recursively applying UV light energy to said 3D object transparent media exterior painted with a UV curable inked image until the entirety of said ink in said image hardens to a permanence level optimized for longevity without sacrificing appearance, and recording said UV light energy amount;
   b. step for expressing an image onto the exterior of said 3D media while rotating said 3D media;
   c. step for exposing the exterior of said 3D object transparent media to a UV cure lamp while rotating and moving said media along its rotational axis in proximity to said cure lamp until said expressed image partially cures into a gelled state;
   d. step for calculating a percentage of said recorded optimal UV dosage amount applied to said 3D media during said step for partial curing;
   e. step for moving said 3D media along its rotational axis into proximity to a UV curing lamp and exposing said expressed image to UV light to achieve final curing of said image on said 3D media; and,
   f. wherein said step for final curing comprises the step of reducing said recorded UV optimal dosage energy amount by the calculated percentage of energy applied during said partial curing step and applying said reduced UV energy amount to said 3D object transparent media during said final curing step.

16. A process for utilizing a power scale factor to control curing of an inked image applied to the surface of transparent media, comprising the steps of:
   a. step for establishing a UV dosage energy amount to optimally cure an expressed image onto the exterior of transparent media;
   b. step for expressing an image onto the exterior of said media while rotating said media;
   c. step for exposing the exterior of said transparent media to a UV cure lamp while rotating and moving said media along its rotational axis in proximity to said cure lamp until said expressed image partially cures into a gelled state;

d. step for calculating a percentage of said UV optimal dosage amount applied to said media during said step for partial curing;
e. step for moving said media along its rotational axis into proximity to a UV curing lamp and exposing said expressed image to UV light to achieve final curing of said image on said media; and,
f. wherein said step for final curing is tailored responsive to said calculated optimal percentage step such that said established UV optimal dosage energy amount is substantially met and,
g. wherein said step for tailoring comprises the steps of;
   i. calculating the amount of UV energy applied to said expressed image during said step for partial curing;
   ii. subtracting said value obtained in said calculating step from said established a UV dosage energy amount necessary to optimally cure said expressed image applied to said media;
   iii. adjusting the amount of UV energy applied to said gelled image in said step for final curing to match the value obtained in said UV energy subtraction step.

17. The process as recited in claim 16, wherein said of step calculating the amount of UV energy applied to said expressed image during said step for partial curing comprises the steps of:
   a. calculating a ratio of media surface being illuminated within a UV illumination zone by a partial cure lamp by dividing the width of the partial curing lamp by the circumference of the media at the location of the image on the media;
   b. calculating the linear velocity along the axis of rotation of the media moving beneath a cure lamp by multiplying the rotational speed of the media by the linear distance the media moves during a single rotation;
   c. calculating the time of exposure of the leading edge of the image as it passes through a cure lamp zone of illumination by dividing the distance traveled through the cure lamp zone of illumination by the calculated linear velocity;
   d. calculating the total amount of UV energy applied to an image expressed onto the surface of the media by multiplying the calculated time of exposure with the power density of the partial curing lamp; and,
   e. multiply the prior calculated ratio of media surface being illuminated with the calculated the total amount of UV energy applied to the image.

18. The process as recited in claim 17, wherein said tailoring step comprises the step selected from the group consisting of a step of reducing the amount of energy that is emitted by a final cure lamp, a step of adjusting the rotational speed of said media when exposed to energy that is emitted by a final cure lamp, the step of adjusting the lateral movement speed of said media along its axis of rotation as said media is exposed to energy that is emitted by a final cure lamp, and a step of calculating a number of rotations that said media is exposed to UV energy emitted by a final cure lamp and adjusting the number of total rotations of said media during said final cure step to comport with said calculated number of rotations.

19. A process for tailoring a final curing step of an expressed image applied to the surface of a 3D object transparent media, comprising the steps of:
   a. empirically establishing an amount of UV energy necessary to optimally cure an image expressed onto the exterior of a 3D object of transparent media, wherein said step of empirically establishing said optimal UV dosage amount comprises recursively applying UV light energy to said 3D object transparent media exterior painted with a UV curable inked image until the entirety of said ink in said image hardens to a permanence level optimized for longevity without sacrificing appearance, and recording said UV light energy amount;
   b. applying said image onto the exterior of said 3D transparent media while rotating said media;
   c. exposing the exterior of said 3D transparent media to a UV cure lamp to partially cure said image into a gelled state;
   d. moving said media along its rotational axis into proximity to a UV curing lamp and exposing said expressed image to UV light to achieve final curing of said image on said 3D media; and,
   e. wherein said final curing step is tailored responsive to the amount of UV energy applied in said partial curing step to adjust the amount of UV energy applied to said exterior of said 3D transparent media such that said recorded optimal amount of UV energy is not exceeded.

20. The process as recited in claim 19, wherein said tailoring step further comprises the step of applying substantially all of said recorded optimal amount of UV energy.

* * * * *